United States Patent
Hayashi et al.

(10) Patent No.: US 9,210,387 B2
(45) Date of Patent: Dec. 8, 2015

(54) COLOR IMAGING ELEMENT AND IMAGING DEVICE

(71) Applicant: FUJIFILM Corporation, Tokyo (JP)

(72) Inventors: Kenkichi Hayashi, Saitama (JP); Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/589,103

(22) Filed: Jan. 5, 2015

(65) Prior Publication Data

US 2015/0116555 A1    Apr. 30, 2015

Related U.S. Application Data

(63) Continuation of application No. PCT/JP2013/055194, filed on Feb. 27, 2013.

(30) Foreign Application Priority Data

Jul. 6, 2012    (JP) .................................. 2012-152905

(51) Int. Cl.
   *H04N 9/04*    (2006.01)
(52) U.S. Cl.
   CPC .................................... *H04N 9/045* (2013.01)
(58) Field of Classification Search
   CPC combination set(s) only.
   See application file for complete search history.

(56) References Cited

U.S. PATENT DOCUMENTS

| | | | |
|---|---|---|---|
| 5,889,554 A | 3/1999 | Mutze | |
| 7,123,299 B1 | 10/2006 | Yoshida et al. | |
| 2002/0149686 A1 | 10/2002 | Taubman | |
| 2006/0012808 A1 | 1/2006 | Mizukura et al. | |
| 2009/0200451 A1 | 8/2009 | Conners | |
| 2009/0278048 A1* | 11/2009 | Choe et al. ............... | 250/339.05 |
| 2010/0128152 A1 | 5/2010 | Hayasaka et al. | |
| 2010/0200658 A1* | 8/2010 | Olmstead et al. ............. | 235/455 |
| 2010/0231770 A1* | 9/2010 | Honda et al. ................. | 348/308 |
| 2012/0293694 A1 | 11/2012 | Hayashi et al. | |
| 2014/0184755 A1* | 7/2014 | Shibazaki et al. ............. | 348/50 |

FOREIGN PATENT DOCUMENTS

| | | |
|---|---|---|
| EP | 1793620 A1 | 6/2007 |
| JP | 2-210996 A | 8/1990 |

(Continued)

OTHER PUBLICATIONS

International Search Report, issued in PCT/JP2013/055194, dated Apr. 9, 2013.

(Continued)

*Primary Examiner* — Mekonnen Dagnew
(74) *Attorney, Agent, or Firm* — Birch, Stewart, Kolasch & Birch, LLP

(57) ABSTRACT

According to a color imaging element and an imaging device of the present invention, because one or more pixels of first filters corresponding to transparence are disposed within a pixel line of each direction of a first direction to a fourth direction of a color filter array, it is possible to acquire brightness information in a high frequency range with high precision and reduce occurrence of a false color (color moire), thereby obtaining image data with excellent resolution. Further, because one or more pixels of the first filters corresponding to transparence are disposed within the pixel line of each direction of the first direction to the fourth direction, it is possible to realize color filters with excellent optical sensitivity.

34 Claims, 17 Drawing Sheets

(56) References Cited

FOREIGN PATENT DOCUMENTS

| | | | |
|---|---|---|---|
| JP | 8-23543 | A | 1/1996 |
| JP | 11-285012 | A | 10/1999 |
| JP | 2000-308071 | A | 11/2000 |
| JP | 2000-308080 | A | 11/2000 |
| JP | 2003-284084 | A | 10/2003 |
| JP | 2005-136766 | A | 5/2005 |
| JP | 2007-288403 | A | 11/2007 |
| JP | 2008-22521 | A | 1/2008 |
| JP | 2010-512048 | A | 4/2010 |
| JP | 2010-154493 | A | 7/2010 |
| JP | 5054856 | B1 | 10/2012 |
| WO | WO 2007/145373 | A2 | 12/2007 |

OTHER PUBLICATIONS

Written Opinion of the International Searching Authority, issued in PCT/JP2013/055194, dated Apr. 9, 2013.
Extended European Search Report dated Aug. 4, 2014, for European Application No. 11859479.5.
Extended European Search Report dated Jan. 27, 2015, for European Application No. 12804973.1.
Extended European Search Report dated Oct. 28, 2014, for European Application No. 11859950.5.
Hirakawa et al., "Spatio-Spectral Color Filter Array Design for Optimal Image Recovery", IEEE Transactions on Image Processing, vol. 17, No. 10, Oct. 2008, pp. 1876-1890.

* cited by examiner

FIG.3
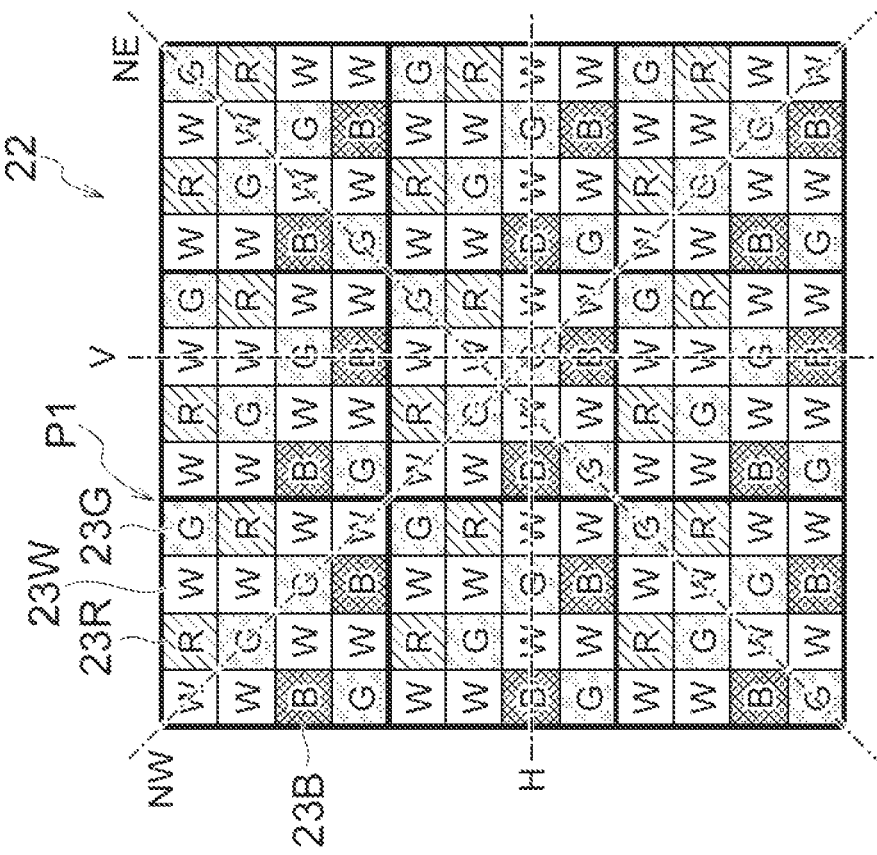
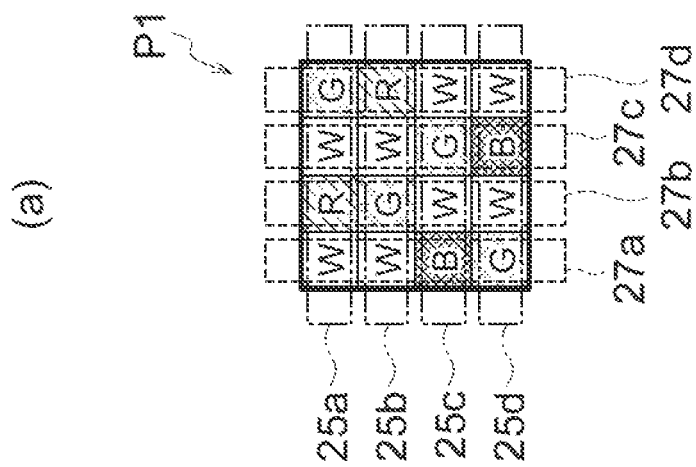

FIG.4
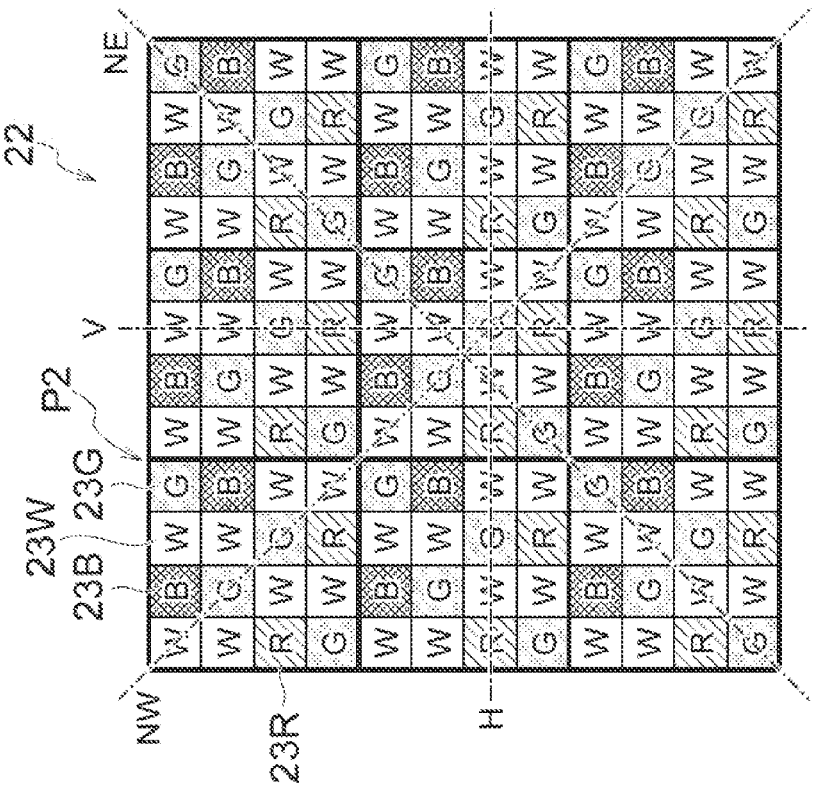
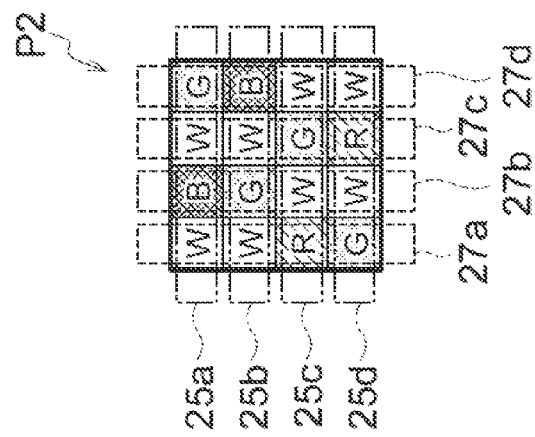

FIG.5

FIG.6
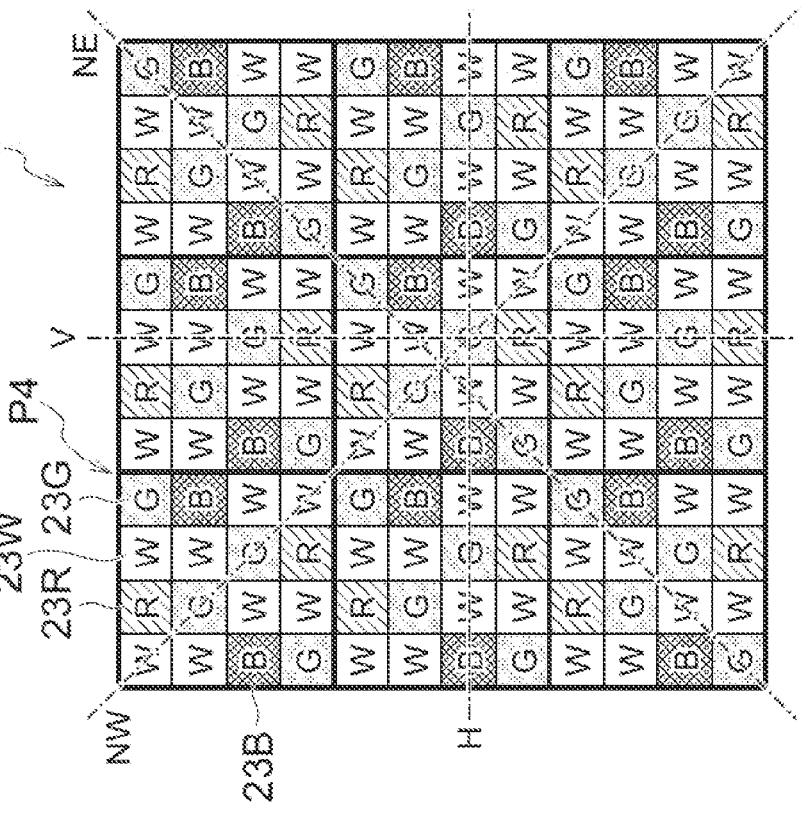
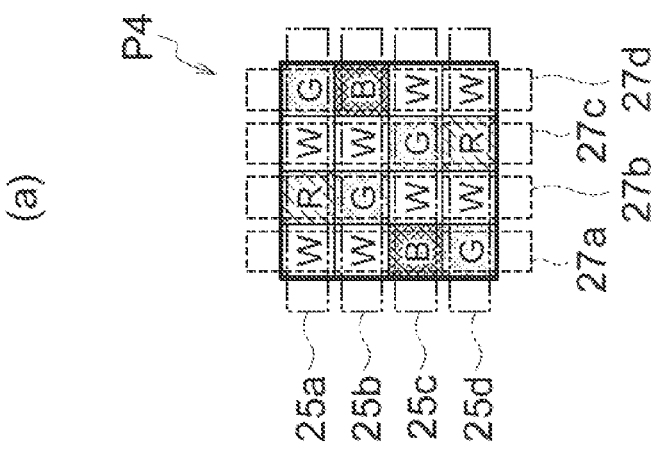

FIG.11
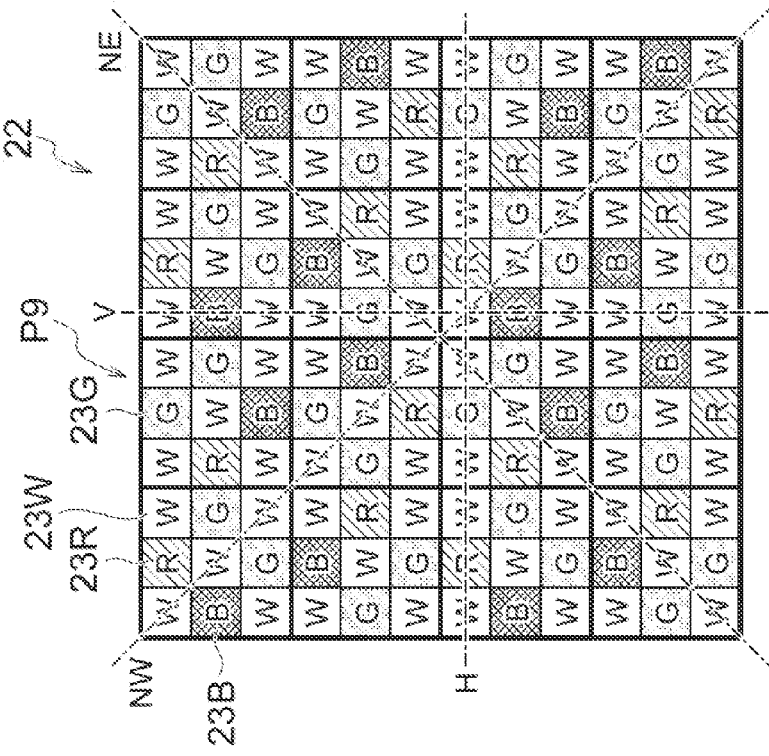
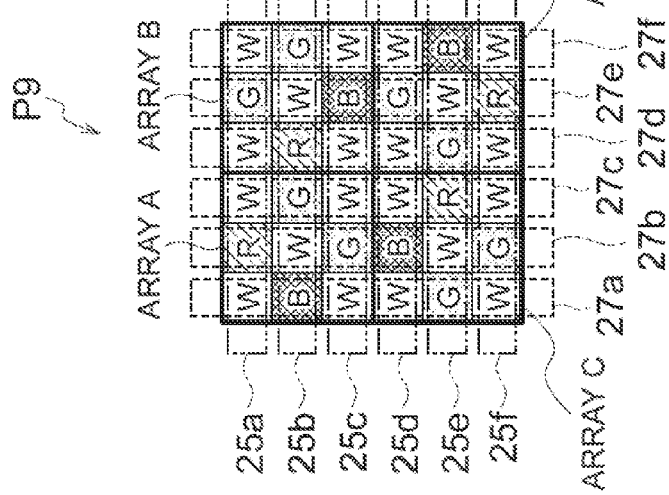

COLOR IMAGING ELEMENT AND IMAGING DEVICE

CROSS-REFERENCE TO RELATED APPLICATIONS

This application is a Continuation of PCT International Application No. PCT/JP2013/055194 filed on Feb. 27, 2013, which claims priority under 35 U.S.C. §119(a) to Japanese Patent Application No. 2012-152905 filed on Jul. 6, 2012. Each of the above application(s) is hereby expressly incorporated by reference, in its entirety, into the present application.

BACKGROUND OF THE INVENTION

1. Field of the Invention

The present invention relates to a color imaging element and an imaging device, and, more particularly, to a color imaging element which can reduce occurrence of color moire and which can realize high resolution, and an imaging device using this color imaging element.

2. Description of the Related Art

In a single plate color imaging element, because a single color filter is provided on each pixel, each pixel has only color information of a single color. Therefore, an output image of the single plate color imaging element is a RAW image (mosaic image), and, thus, processing (mosaic processing) for interpolating a pixel of a missing color with peripheral pixels is performed to obtain a multichannel image. In this case, there is a problem in reproduction characteristics of an image signal of a high frequency, and because, with color imaging elements, aliasing is more likely to occur in the taken image than with black-and-white imaging elements, realizing high resolution by expanding a reproduction band while suppressing occurrence of color moire (false color) is an important issue.

Because a primary color Bayer array which is a color array of the color filters most-widely used in the single plate color imaging element is an array in which green (G) pixels are arranged in a checkerboard design and red (R) and blue (B) pixels are arranged in a line-sequential manner, there is a problem in reproduction precision upon generation of a high frequency signal in which a G signal is in a diagonal direction and R and B signals are in horizontal and vertical directions.

When a black-and-white vertically-striped pattern (high frequency image) as shown in FIG. 16(A) is incident on color imaging elements having color filters with a Bayer array shown in FIG. 16(B), if colors are compared by being sorted by the color Bayer array, as shown in FIGS. 16(C) to 16(E), R becomes a light plain color image, B becomes a dark plain color image, and G becomes a gray-scaled mosaic color image, and thus an image which should have originally been a black-and-white image, and which should not have included a difference in concentration (difference in level) among R, G and B, is colored depending on a color array and an input frequency.

In a similar manner, when a diagonal black-and-white high frequency image as shown in FIG. 17(A) is incident on imaging elements having color filters with a Bayer array shown in FIG. 17(B), if colors are compared by being sorted by the color Bayer array, as shown in FIG. 17(C) to 17(E), R and B become light plain color images, and G becomes a dark plain color image, and if a value of black is set to 0, and a value of white is set to 255, because only G is 255 in the diagonal black-and-white high frequency image, the diagonal black-and-white high frequency image becomes green. In this way, it is impossible to correctly reproduce a diagonal high frequency image with the Bayer array.

Typically, in an imaging device using a single plate color imaging element, a high frequency is avoided by disposing an optical low-pass filter comprised of birefringent substance such as a crystal on the front of the color imaging element so that the high frequency is optically removed. However, such a method has a problem that while it is possible to reduce coloring due to folding of a high frequency signal, resolution degrades as its adverse effect.

To solve such a problem, there has been proposed a color imaging element in which a color filter array of the color imaging element is arranged in a three-color random array which satisfies an array restriction condition that an arbitrary target pixel is adjacent to three colors including a color of the target pixel at any of four sides of the target pixel (Japanese Patent Application Laid-Open No. 2000-308080, PTL 1).

Further, there has been proposed an image sensor (color imaging element) with a color filter array, which has a plurality of filters (light receiving elements) with different spectral sensitivity, and in which, among the filters, a first filter and a second filter are alternately arranged in one of diagonal directions of a pixel lattice of the image sensor in a first predetermined cycle and are alternately arranged in the other of the diagonal directions in a second predetermined cycle (Japanese Patent Application Laid-Open No. 2005-136766. PTL 2).

Still further, there has been proposed a color array of a color solid-state imaging element having three primary colors of RGB, in which sets of three pixels of horizontally arranged R, G and B are arranged while the sets are displaced in a zig-zag manner in a vertical direction, so that probabilities of appearance of RGB are made equal and an arbitrary line (horizontal, vertical or diagonal line) on the imaging face is made to pass all the colors (Japanese Patent Application Laid-Open No. 11-285012; PTL 3).

Yet further, there has been proposed a color imaging element in which among the three primary colors of RGB, R and B are arranged every third pixel in a horizontal direction and in a vertical direction, and G is arranged between R and B (Japanese Patent Application Laid-Open No. 8-23543; PTL 4).

Other than the above, various color filters have been proposed in PTL 5 to PTL 8 (Japanese Patent Application Laid-Open Nos. 2010-512048, 2008-02252, 2007-288403, 2010-154493, respectively).

SUMMARY OF THE INVENTION

As described above, general color filters do not address image quality defects such as color moire due to a high frequency component at all or address the image quality defects using an optical low-pass filter or the like. Therefore, in the first place, there is no idea in the general color filters, of improving color reproducibility and preventing image quality defects due to a high frequency component by devising a color filter array.

The color imaging element disclosed in PTL 1 has a problem that because the filter array is random, when de-mosaic processing is performed in a subsequent stage, it is necessary to perform optimization for each random pattern, which makes the de-mosaic processing complicated. Further, while the random array is effective for color moire in a lower frequency, the random array is not effective for a false color in a high frequency portion. Here, the de-mosaic processing which is processing for calculating (and simultaneously converting) all the color information of RGB for each pixel from a mosaic image of RGB associated with the color filter array of a single plate color imaging element, is also called demosaicing processing or synchronization processing (which are the same in the present specification).

Further, the color imaging element disclosed in PTL 2 has a problem that because G pixels (brightness pixels) are arranged in a checkerboard design, pixel reproduction precision is not good in a limiting resolution area (particularly in a diagonal direction).

While the color imaging element disclosed in PTL 3 has an advantage that it is possible to suppress occurrence of a false color because filters of all the colors exist on an arbitrary line, there is a problem that because a ratio of the number of pixels is equal among R, G and B, high frequency reproducibility degrades compared to the case of the Bayer array. It should be noted that, in the case of the Bayer array, the ratio of the number of pixels of G which contributes most to obtain a brightness signal is twice as high as the respective ratios of the numbers of pixels of R and B.

Meanwhile, in the color imaging element disclosed in PTL 4, a ratio of the number of pixels of G is six times as high as the respective ratios of the numbers of pixels of R and G, which is very high compared to the case of the Bayer array, and therefore color reproducibility degrades.

Further, while PTL 5 to PTL 8 disclose various arrangement as to the color filter array including a transparent pixel (white pixel), PTL 5 to PTL 8 neither discloses nor suggests improving a sampling frequency using a transparent pixel (white pixel), and nowhere proposes improving color reproducibility or preventing a defect in image quality due to a high frequency component through the color filter array.

Particularly, when the color filter array disclosed in PTL 5 is utilized, in terms of improvement in precision of so-called demosaicing processing, an arrangement interval between pixels G (green) is made large. That is, in terms of sensitivity characteristics of human vision, influence of pixels G on color reproduction precision (precision of demosaicing processing) is large. However, with the color imaging element of PTL 5, because an interval between pixels G is large, for example, in a 4×4 pixel region in which pixels R exist, or in a 4×4 pixel region in which pixels B exist, precision of demosaicing processing becomes very low. Further, also in a 4×4 pixel region in which pixels G exist, because an interval between pixels R or between pixels B is large, precision of demosaicing processing becomes very low.

The present invention has been made in view of the foregoing circumstances, and an object thereof is to provide a color imaging element which improves a sampling frequency using a transparent pixel (white pixel) and which has actually high color reproduction precision. Further, an object of the present invention is to provide an imaging device using this color imaging element.

One aspect of the present invention is a single plate color imaging element in which color filters are disposed on a plurality of pixels comprised of photoelectric conversion elements arranged in a first direction and in a second direction perpendicular to the first direction, an array of the color filters includes a basic array pattern in which the color filters are arranged in an array pattern corresponding to M×N (where M is an integer of four or greater, and N is an integer of four or greater) pixels in the first direction and in the second direction, the basic array pattern is repeatedly disposed in the first direction and in the second direction, the color filters include at least a first filter corresponding to transparence, a second filter having higher transmittance with respect to a first visible light wavelength region in a visible light wavelength region than other visible light wavelength regions, a third filter having higher transmittance with respect to a second visible light wavelength region which is different from the first visible light wavelength region in the visible light wavelength region than other visible light wavelength regions and a fourth filter having higher transmittance with respect to a third visible light wavelength region which is different from the first visible light wavelength region and the second visible light wavelength region in the visible light wavelength region than other visible light wavelength regions, in the basic array pattern, the first filter, the second filter, the third filter and the fourth filter are disposed at least one pixel each, a color corresponding to the first visible light wavelength region has a higher contribution ratio to obtain a brightness signal than a color corresponding to the second visible light wavelength region and a color corresponding to the third visible light wavelength region, in the array of the color filters, the first filter corresponding to at least one pixel is disposed on each pixel line extending in the first direction, on each pixel line extending in the second direction and on each pixel line extending in each of the third direction and the fourth direction which are tilted with respect to the first direction and the second direction, the second filter corresponding to at least one pixel is disposed on each pixel line extending in the first direction and on each pixel line extending in the second direction, and each of the third filter and the fourth filter is disposed adjacent to the second filter.

Another aspect of the present invention is a single plate color imaging element in which color filters are disposed on a plurality of pixels comprised of photoelectric conversion elements arranged in a first direction and in a second direction perpendicular to the first direction, an array of the color filters includes a basic array pattern in which the color filters are arranged in an array pattern corresponding to M×N (where M is an integer of four or greater, and N is an integer of four or greater) pixels in the first direction and in the second direction, the basic array pattern is repeatedly disposed in the first direction and in the second direction, the color filters include at least a first filter corresponding to transparence, a second filter having higher transmittance with respect to a first visible light wavelength region in a visible light wavelength region than other visible light wavelength regions, a third filter having higher transmittance with respect to a second visible light wavelength region which is different from the first visible light wavelength region in the visible light wavelength region than other visible light wavelength regions and a fourth filter having higher transmittance with respect to a third visible light wavelength region which is different from the first visible light wavelength region and the second visible light wavelength region in the visible light wavelength region than other visible light wavelength regions, in the basic array pattern, the first filter, the second filter, the third filter and the fourth filter are disposed at least one pixel each, the second filter has a peak of transmittance within a range of a wavelength between 480 nm and 570 nm, the third filter and the fourth filter have peaks of transmittance outside the range, in the array of the color filters, the first filter corresponding to at least one pixel is disposed on each pixel line extending in the first direction, on each pixel line extending in the second direction and on each pixel line extending in each of the third direction and the fourth direction which are tilted with respect to the first direction and the second direction, the second filter corresponding to at least one pixel is disposed on each pixel line extending in the first direction and on each pixel line extending in the second direction, and each of the third filter and the fourth filter is disposed adjacent to the second filter.

Another aspect of the present invention is a single plate color imaging element in which color filters are disposed on a plurality of pixels comprised of photoelectric conversion elements arranged in a first direction and in a second direction perpendicular to the first direction, an array of the color filters includes a basic array pattern in which the color filters are arranged in an array pattern corresponding to M×N (where M is an integer of four or greater, and N is an integer of four or greater) pixels in the first direction and in the second direction, the basic array pattern is repeatedly disposed in the first direction and in the second direction, the color filters include at least a first filter corresponding to transparence, a second filter having higher transmittance with respect to a first visible light wavelength region in a visible light wavelength region than other visible light wavelength regions, a third filter having higher transmittance with respect to a second visible light wavelength region which is different from the first visible light wavelength region in the visible light wavelength region than other visible light wavelength regions and a fourth filter having higher transmittance with respect to a third visible light wavelength region which is different from the first visible light wavelength region and the second visible light wavelength region in the visible light wavelength region than other visible light wavelength regions, in the basic array pattern, the first filter, the second filter, the third filter and the fourth filter are disposed at least one pixel each, the first visible light wavelength region falls within a range of a wavelength between 500 nm and 560 nm, in the array of the color filters, the first filter corresponding to at least one pixel is disposed on each pixel line extending in the first direction, on each pixel line extending in the second direction and on each pixel line extending in each of the third direction and the fourth direction which are tilted with respect to the first direction and the second direction, the second filter corresponding to at least one pixel is disposed on each pixel line extending in the first direction and on each pixel line extending in the second direction, and each of the third filter and the fourth filter is disposed adjacent to the second filter.

Another aspect of the present invention is a single plate color imaging element in which color filters are disposed on a plurality of pixels comprised of photoelectric conversion elements arranged in a first direction and in a second direction perpendicular to the first direction, an array of the color filters includes a basic array pattern in which the color filters are arranged in an array pattern corresponding to M×N (where M is an integer of four or greater, and N is an integer of four or greater) pixels in the first direction and in the second direction, the basic array pattern is repeatedly disposed in the first direction and in the second direction, the color filters include at least a first filter corresponding to transparence, a second filter having higher transmittance with respect to a first visible light wavelength region in a visible light wavelength region than other visible light wavelength regions, a third filter having higher transmittance with respect to a second visible light wavelength region which is different from the first visible light wavelength region in the visible light wavelength region than other visible light wavelength regions and a fourth filter having higher transmittance with respect to a third visible light wavelength region which is different from the first visible light wavelength region and the second visible light wavelength region in the visible light wavelength region than other visible light wavelength regions, in the basic array pattern, the first filter, the second filter, the third filter and the fourth filter are disposed at least one pixel each, the first visible light wavelength region includes a visible light wavelength region corresponding to a color contributing most to brightness signals among three primary colors and a visible light wavelength region corresponding to a color different from the three primary colors, the second filter includes a filter having higher transmittance with respect to the visible light wavelength region corresponding to the color contributing most to a brightness signal among the three primary colors than other visible light wavelength regions, and a filter having higher transmittance with respect to the visible light wavelength region corresponding to the color different from the three primary colors than other visible light wavelength regions, in the array of the color filters, the first filter corresponding to at least one pixel is disposed on each pixel line extending in the first direction, on each pixel line extending in the second direction and on each pixel line extending in each of the third direction and the fourth direction which are tilted with respect to the first direction and the second direction, the second filter corresponding to at least one pixel is disposed on each pixel line extending in the first direction and on each pixel line extending in the second direction, and each of the third filter and the fourth filter is disposed adjacent to the second filter.

According to these aspects, because one pixel or more of the first filters corresponding to transparence are disposed within a pixel line of each direction of the first direction to the fourth direction in the array of color filters, it is possible to acquire brightness information in a high frequency range with high precision. By this means, it is possible to obtain image data with excellent resolution by reducing occurrence of a false color (color moire). Further, by disposing one pixel or more of the first filters corresponding to transparence within a pixel line of each direction of the first direction to the fourth direction, it is possible to realize a color imaging element with excellent optical sensitivity. Further, because the second filter is disposed at least on each pixel line of the first direction and on each pixel line of the second direction, it is possible to efficiently dispose the second filter in a dispersed manner in the first direction and in the second direction. Still further, each of the third filter and the fourth filter is also disposed adjacent to the second filter, it is possible to efficiently dispose the third filter and the fourth filter in a dispersed manner in the first direction and in the second direction.

A filter being "adjacent" to another filter described here not only indicates a case where, for example, a filter is adjacent to another filter in the first direction and in the second direction, but also indicates a case where a filter is adjacent to another filter in the third direction and in the fourth direction.

Further, because, in the array of color filters, the basic array pattern is repeatedly disposed in the first direction and in the second direction, it is possible to perform processing according to the repeating pattern when performing demosaicing processing in the subsequent stage, so that it is possible to simplify the processing in the subsequent stage compared to the case of the conventional random array.

It is preferable that, in the array of the color filters, the second filters are disposed in two or more pixels among eight pixels adjacent around each of the pixel in which the first filter is disposed, the pixel in which the third filter is disposed and the pixel in which the fourth filter is disposed.

According to the present aspect, a plurality of the second filters can be efficiently disposed in a dispersed manner around other filters, so that it is possible to improve color reproduction precision of the color corresponding to the second filter. The "eight pixels adjacent around" described here is, for example, comprised of pixels (total of four pixels) adjacent to the pixel of interest in the first direction and in the second direction, and pixels (total of four pixels) adjacent to the pixel of interest in the third direction and in the fourth direction.

It is preferable that, in the array of color filters, the second filters are disposed in one or more pixels among eight pixels adjacent around each of the pixels in which the second filters are disposed.

According to the present aspect, a plurality of the second filters can be efficiently disposed in a dispersed manner around the second filter, so that it is possible to improve color reproduction precision as to the color corresponding to the second filter.

It is preferable that, in the basic array pattern, the third filter corresponding to at least one pixel and the fourth filter corresponding to at least one pixel are disposed on each pixel line extending in the first direction and on each pixel line extending in the second direction.

According to the present aspect, each of the third filter and the fourth filter can be efficiently disposed in a dispersed manner in the first direction and in the second direction, so that it is possible to improve color reproduction precision as to the colors corresponding to the third filter and the fourth filter.

It is preferable that, in the basic array pattern, the numbers of pixels satisfy the following relationships: the number of pixels in which the first filters are disposed≥the number of pixels in which the second filters are disposed≥the number of pixels in which the third filters are disposed, and the number of pixels in which the first filters are disposed≥the number of pixels in which the second filters are disposed≥the number of pixels in which the fourth filters are disposed.

According to the present aspect, it is possible to dispose more first filters corresponding to transparence than any other filters, and it is possible to dispose more second filters than the third filters and the fourth filters.

It is preferable that, in the array of the color filters, the pixels in which the first filters are disposed are disposed adjacent to the pixels in which the second filters are disposed.

According to the present aspect, the first filters can be disposed adjacent to the second filters, so that it is possible to effectively utilize image data obtained through the second filters when image data interpolation processing or the like, is performed for pixel positions of the first filters corresponding to transparence.

It is preferable that, in the basic array pattern, the color filters are arranged in an array pattern corresponding to M×N (where M is an integer of six or greater, and N is an integer of six or greater) pixels in the first direction and in the second direction, and the basic array pattern includes two first sub-arrays and two second sub-arrays which are two types of sub-arrays in which the color filters are arranged in an array pattern corresponding to (M/2)×(N/2) pixels, and in each of the first sub-arrays and the second sub-arrays, the first filter, the second filter, the third filter and the fourth filter being disposed at least one pixel each.

It is preferable that, in the basic array pattern, the color filters are arranged in an array pattern corresponding to M×N (where M is an integer of six or greater, and N is an integer of six or greater) pixels in the first direction and in the second direction, the basic array pattern includes a first sub-array, a second sub-array, a third sub-array and a fourth sub-array which are four types of sub-arrays in which the color filters are arranged in an array pattern corresponding to (M/2)×(N/2) pixels, in each of the first sub-array, the second sub-array, the third sub-array and the fourth sub-array, the first filter, the second filter, the third filter and the fourth filter being disposed at least one pixel each.

It is preferable that the sub-arrays configuring the basic array pattern include a pair of sub-arrays which has positional relationship in which the positions of the third filters and the positions of the fourth filters in each sub-array are inverted.

According to the present aspect, it is possible to dispose the third filters and the fourth filters with regularity in a dispersed manner, and prevent demosaicing processing from becoming complicated even when the size of the basic array pattern becomes large.

It is preferable that the first filter has transmittance of 50% or higher in the first visible light wavelength region, the second visible light wavelength region and the third visible light wavelength region.

It is preferable that the first visible light wavelength region, the second visible light wavelength region and the third visible light wavelength region correspond to the three primary colors, and the color filters further include a fifth filter which has higher transmittance with respect to a visible light wavelength region corresponding to a color different from the three primary colors than other visible light wavelength regions.

It is preferable that the first visible light wavelength region corresponds to green, the second visible light wavelength region corresponds to red, and the third visible light wavelength region corresponds to blue.

An imaging device which achieves the object of the present invention includes an imaging optical system, a color imaging element at which a subject image is formed through the imaging optical system, and an image data generating unit that generates image data indicating the formed subject image, and the color imaging element is a color imaging element according to any of the above-described aspects.

According to the color imaging element and the imaging device of the present invention, because one or more pixels of the first filters corresponding to transparence are disposed within a pixel line of each direction of the first direction to the fourth direction of the color filter array, it is possible to acquire brightness information in a high frequency range with high precision, reduce occurrence of a false color (color moire), so that it is possible to obtain image data with excellent resolution. Further, because one or more pixels of the first filters corresponding to transparence are disposed within a pixel line of each direction of the first direction to the fourth direction, it is possible to realize color filters with excellent optical sensitivity.

Further, because, in the color filter array, the basic array pattern is repeatedly disposed in the first direction and in the second direction, it is possible to perform processing according to the repeating pattern when performing de-mosaic processing in the subsequent stage, so that it is possible to simplify processing in the subsequent stage compared to the case of the conventional random array.

BRIEF DESCRIPTION OF THE DRAWINGS

FIG. 3 is a diagram showing a color filter array according to a first embodiment, (a) portion shows one basic array pattern, and (b) portion shows a state where a total of nine basic array patterns of (a) portion are disposed, three in the horizontal direction and three in the vertical direction.

FIG. 4 is a diagram showing a color filter array according to a second embodiment, (a) portion shows one basic array pattern, and (b) portion shows a state where a total of nine basic array patterns of (a) portion are disposed, three in the horizontal direction and three in the vertical direction.

FIG. 5 is a diagram showing a basic array pattern of color filters according to a third embodiment, (a) portion shows one basic array pattern, and (b) portion shows a state where a total of nine basic array patterns of (a) portion are disposed, three in the horizontal direction and three in the vertical direction.

FIG. 6 is a diagram showing a basic array pattern of color filters according to a fourth embodiment, (a) portion shows one basic array pattern, and (b) portion shows a state where a total of nine basic array patterns of (a) portion are disposed, three in the horizontal direction and three in the vertical direction.

FIG. 11 is a diagram showing a basic array pattern of color filters according to a ninth embodiment, (a) portion shows one basic array pattern, and (b) portion shows a state where a total of four basic array patterns of (a) portion are disposed, two in the horizontal direction and two in the vertical direction.

DETAILED DESCRIPTION OF THE EMBODIMENTS

[Overall Configuration of Digital Camera]

Figure 1:
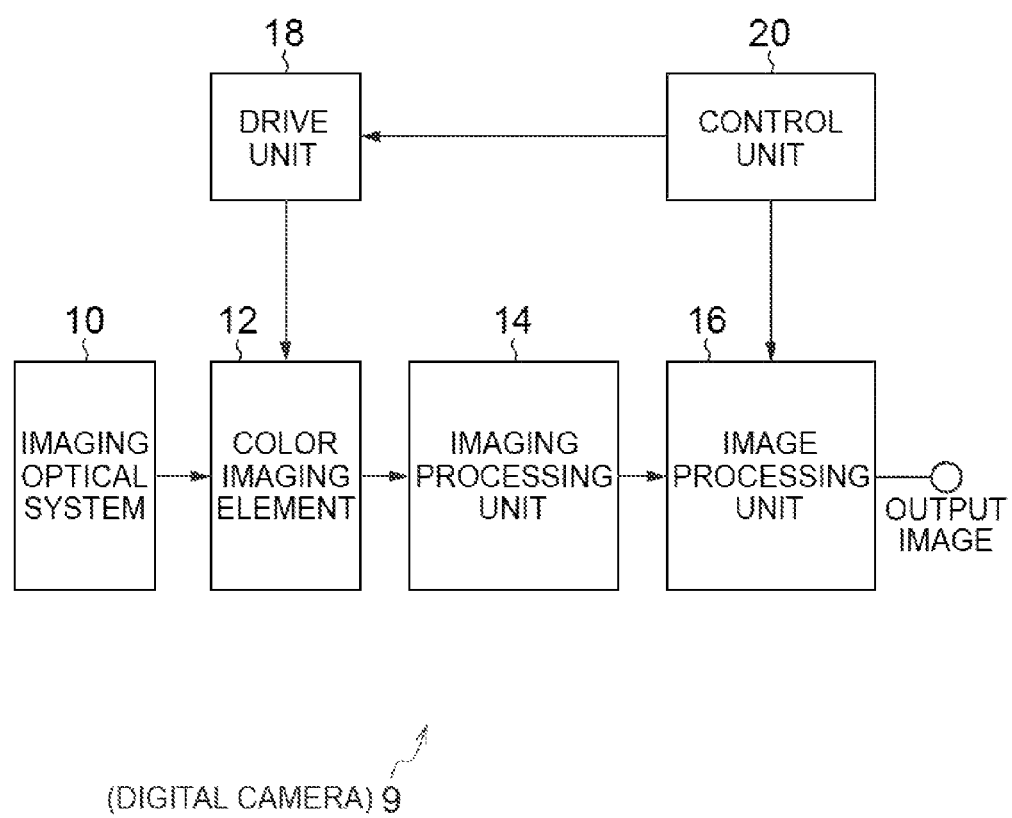
FIG. 1 is a block diagram showing an electrical configuration of a digital camera.

FIG. 1 is a block diagram of a digital camera 9 provided with a color imaging element according to the present invention. The digital camera 9 mainly includes an imaging optical system 10, a color imaging element 12, an imaging processing unit 14, an image processing unit 16, a drive unit 18, a control unit 20, and the like.

The imaging optical system 10 forms a subject image on an imaging face of the color imaging element 12. The color imaging element 12 is, so-called, a single plate color imaging element, and includes a plurality of pixels comprised of photoelectric conversion elements arranged in the horizontal direction and in the vertical direction in the drawing (arranged in two dimensions) on the imaging face and color filters provided above the light receiving faces of the respective pixels. Here, "above" and "on" designate a direction at a side a subject light is incident on the imaging face of the color imaging element 12.

The subject image formed by the color imaging element 12 is converted into signal charges according to an amount of incident light by the photoelectric conversion element of each pixel. The signal charges accumulated at each photoelectric conversion element are sequentially retrieved from the color imaging element 12 as a voltage signal (image signal) according to the signal charges based on a drive pulse which is provided from the drive unit 18 according to an instruction from the control unit 20. The image signal retrieved from the color imaging element 12 is a signal indicating a mosaic image having colors corresponding to the color filter array of the color imaging element 12. It should be noted that the color imaging element 12 may be other types of imaging elements such as a CCD (Charge Coupled Device) imaging element and a CMOS (Complementary Metal Oxide Semiconductor) imaging element.

The image signal retrieved from the color imaging element 12 is input to the imaging processing unit 14. The imaging processing unit 14 has a correlated double sampling circuit (CDS) for removing a reset noise included in the image signal, an AGC circuit for amplifying the image signal to control the image signal to have a certain level of magnitude, and an A/D converter. The imaging processing unit 14 performs correlated double sampling processing on the input image signal and amplifies the image signal, and then, outputs RAW data obtained by converting the image signal into a digital image signal to the image processing unit 16. It should be noted that if the color imaging element 12 is a MOS imaging element, the A/D converter is often built into the imaging element, and the above-described correlated double sampling may not be required.

The image processing unit 16 has a white balance correction circuit, a gamma correction circuit, a de-mosaic processing circuit (processing circuit for calculating (and simultaneously converting) all the color information of RGB for each pixel from a mosaic image of RGB associated with the color filter array of the single plate color imaging element 12), a brightness/color difference signal generation circuit, a contour correction circuit, a color correction circuit, and the like. The image processing unit 16 performs desired signal processing on the RAW data of the mosaic image input from the imaging processing unit 14 according to an instruction from the control unit 20 to generate an RGB pixel signal having all the color information of RGB for each pixel, and generates image data (YUV data) comprised of brightness data (Y data) and color difference data (Cr, Cb data) based on the RGB pixel signal.

The image data generated at the image processing unit 16 is subjected to compression processing conforming to the JPEG standard if the image data is a still image, and subjected to compression processing conforming to the MPEG2 standard if the image data is a moving image, by a compression/expansion process circuit, and then, recorded in a recording medium (for example, a memory card) which is not shown, output to display means (not shown) such as a liquid crystal monitor, and displayed. It should be noted that, in the present embodiment, the recording medium is not limited to one which can be attached to and removed from the digital camera 9 and may be a built-in magnetooptical recording medium, and the display means is not limited to one provided at the digital camera 9 and may be an external display connected to the digital camera 9.

[Color Imaging Element]

Figure 2:
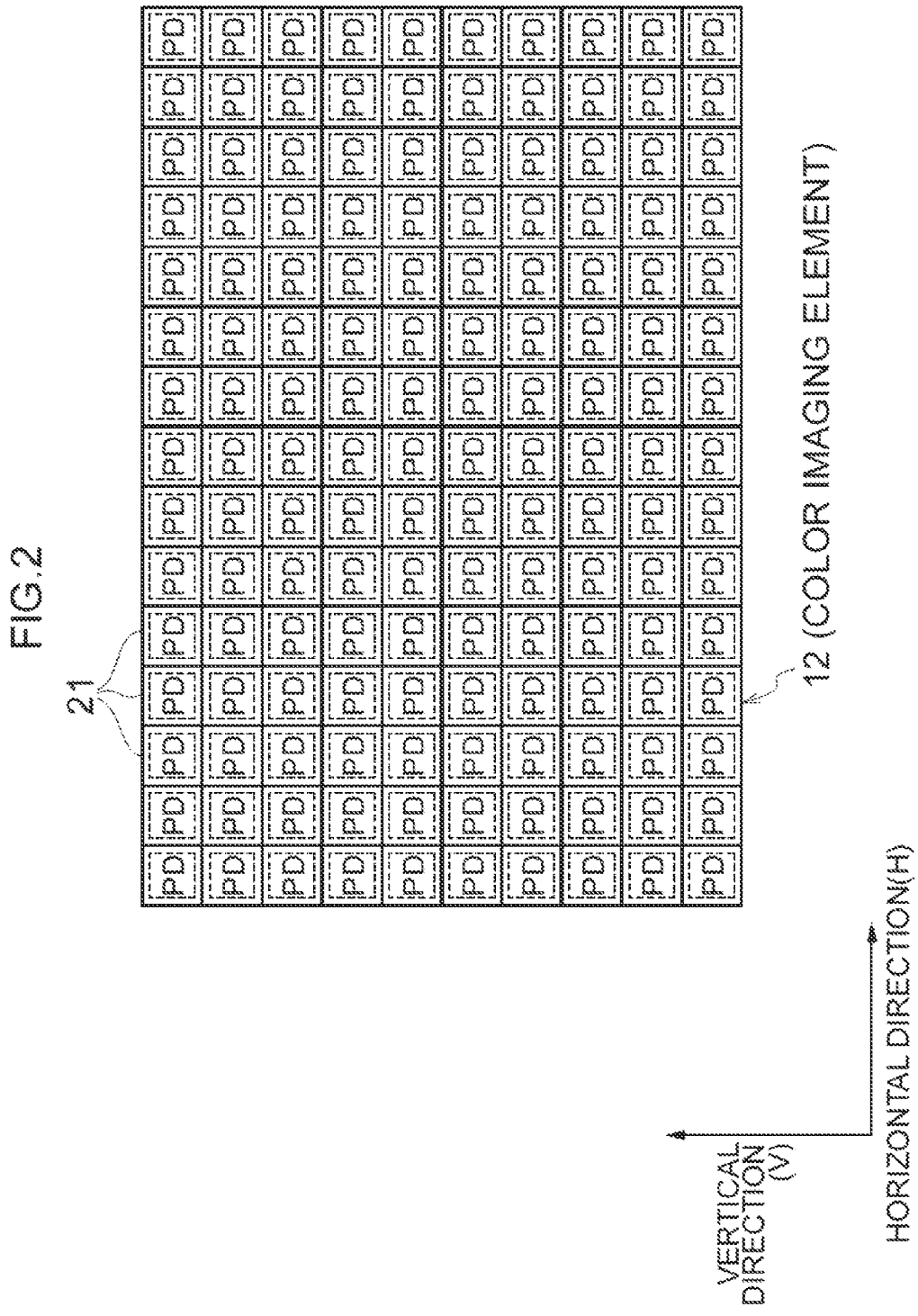
FIG. 2 is a front view of an imaging face of a color imaging element.

As shown in FIG. 2, a plurality of pixels 21 comprised of photoelectric conversion elements PD which are arranged in two dimensions in a horizontal direction and in a vertical direction are provided on the imaging face of the color imaging element 12. Here, the horizontal direction corresponds to one direction of a first direction and a second direction of the present invention, and the vertical direction corresponds to the other direction of the first direction and the second direction of the present invention.

On the imaging face of the color imaging element 12, a color filter array 22 comprised of color filters disposed on the respective pixels 21 are provided (see (a) portion of FIG. 3).

The color filters of this example include a W filter (first filter) corresponding to transparence, a G filter (second filter) having higher transmittance with respect to a visible light wavelength region of green (first visible light wavelength region) in a visible light wavelength region than other visible light wavelength regions, an R filter (third filter) having higher transmittance with respect to a visible light wavelength region of red (second visible light wavelength region) which is different from the visible light wavelength of green in the visible light wavelength region than other visible light wavelength regions, and a B filter (fourth filter) having higher transmittance with respect to a visible light wavelength region of blue (third visible light wavelength region) which is different from the visible light wavelength region of green and the visible light wavelength region of red in the visible light wavelength region than other visible light wavelength regions.

That is, the color filter array 22 is comprised of color filters of the three primary colors of red (R), green (G) and blue (B) (hereinafter, referred to as an R filter, a G filter and a B filter) 23R, 23G and 23B and a transparent filter (W filter) 23W, one of the RGBW filters 23R, 23G, 23B and 23W is disposed on each pixel 21. Hereinafter, a pixel in which the R filter 23R is disposed is referred to as a "pixel R", a pixel in which the G filter 23G is disposed is referred to as a "pixel G", a pixel in which the B filter 23B is disposed is referred to as a "pixel B", and a pixel in which the transparent filter 23W is disposed is referred to as a "pixel".

Figure 12:
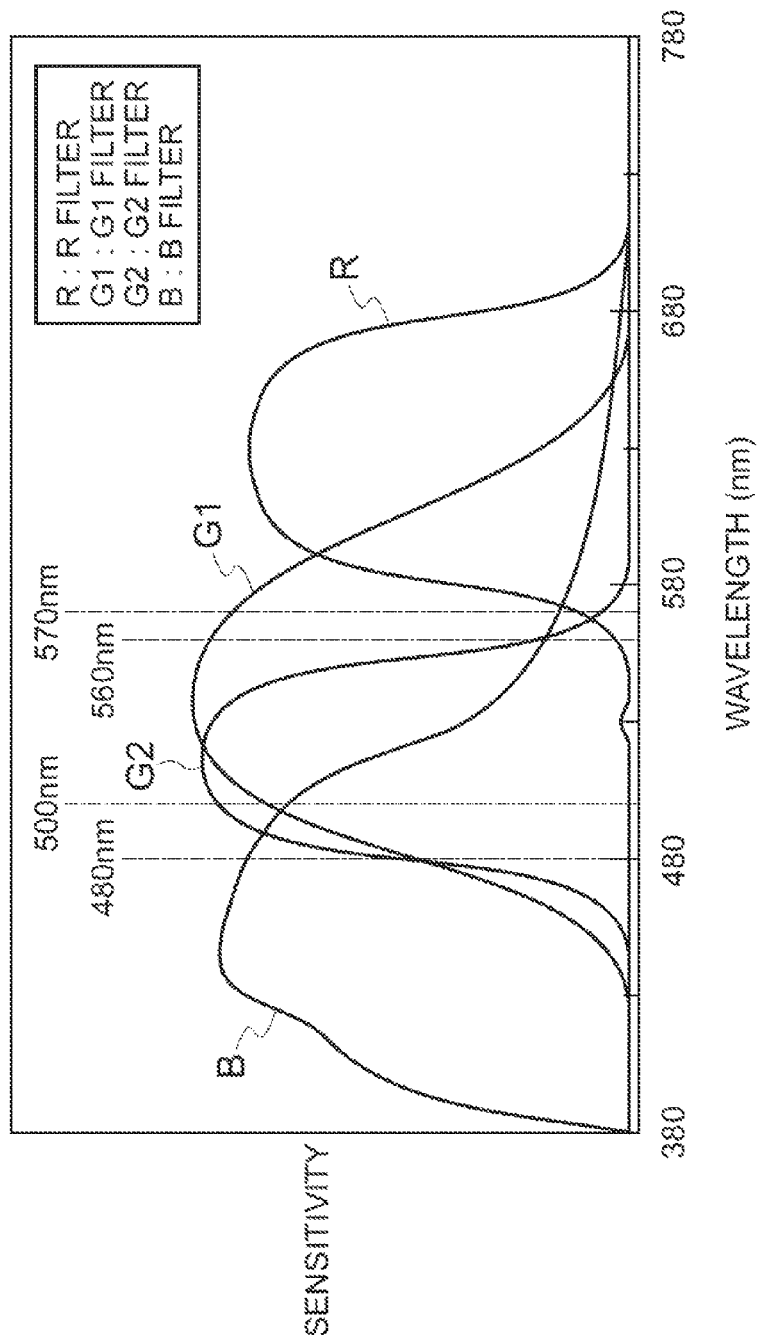
FIG. 12 is a graph showing spectral sensitivity characteristics of light receiving elements in which an R filter (red filter), a G1 filter (first green filter), a G2 filter (second green filter) and a B filter (blue filter) are disposed.

Relationship of each filter and a transparent visible light wavelength region will be described later (see FIG. 12).

First Embodiment

A color filter array 22 according to the present embodiment has the following characteristics.

[Characteristics (1)]

As shown in (a), (b) portions of FIG. 3, the color filter array 22 includes a basic array pattern P1 which is a square array pattern corresponding to 4×4 pixels (M×N pixels) in the horizontal direction and in the vertical direction, and this basic array pattern P1 is repeatedly disposed in the horizontal direction and in the vertical direction. This basic array pattern P1 includes R filters 23R, G filters 23G, B filters 23B and transparent filters 23W of each color. Therefore, in the color filter array 22, the R filters 23R, the G filters 23G, the B filters 23B and the transparent filters 23W are periodically arranged.

Therefore, when de-mosaic processing, or the like, is performed on the R, G, B signals retrieved from the color imaging element 12, the processing can be performed according to the repeating pattern. As a result, it is possible to simplify the processing in the subsequent stage compared to the case of the conventional random array. Further, when thinning processing is performed in units of the basic array pattern P1 to reduce the size of the image, the color filter array after the thinning processing can be made the same as the color filter array prior to the thinning processing, so that it is possible to use a common processing circuit.

[Characteristics (2)]

In the basic array pattern P1, four types of pixel lines (a first filter horizontal array 25a, a second filter horizontal array 25b, a third filter horizontal array 25c and a fourth filter horizontal array 25d) extending in parallel in the horizontal direction are sequentially arranged in the vertical direction (see (a) portion of FIG. 3). The first filter horizontal array 25a is a "filter array (pixel line) in which a transparent filter 23W, an R filter 23R, a transparent filter 23W and a G filter 23G are disposed in parallel in the horizontal direction", the second filter horizontal array 25b is a "filter array in which a transparent filter 23W, a G filter 23G, a transparent filter 23W and an R filter 23R are disposed in parallel in the horizontal direction", the third filter horizontal array 25c is a "filter array in which a B filter 23B, a transparent filter 23W, a G filter 23G and a transparent filter 23W are disposed in parallel in the horizontal direction", and the fourth filter horizontal array 25d is a "filter array in which a G filter 23G, a transparent filter 23W, a B filter 23B and a transparent filter 23W are disposed in parallel in the horizontal direction". With these filter arrays, in the basic array pattern P1 according to the present embodiment, four types of pixel lines (a first filter vertical array 27a, a second filter vertical array 27b, a third filter vertical array 27c and a fourth filter vertical array 27d) extending in parallel in the vertical direction are formed.

In this basic array pattern P1, all the filter horizontal arrays and the filter vertical arrays respectively include two pixels of the transparent filters 23W, and four sets of transparent filters 23W each including two pixels which are adjacent in the vertical direction are formed. Sets of the adjacent transparent filters 23W in the first filter vertical array 27a and in the third filter vertical array 27c and sets of the adjacent transparent filters 23W in the second filter vertical array 27b and in the fourth filter vertical array 27d are alternately disposed in a zigzag manner in the vertical direction.

Further, the G filters 23G are disposed in a dispersed manner in the horizontal direction and in the vertical direction, and all the filter horizontal arrays and the filter vertical arrays respectively include one pixel of the G filter 23G.

Further, the R filters 23R and the B filters 23B are disposed in a dispersed manner in the horizontal direction and in the vertical direction, and all the filter horizontal arrays and the filter vertical arrays respectively include one pixel of one of the R filter 23R and the B filter 23B.

Therefore, each filter horizontal array and each filter vertical array in the basic array pattern P1 are respectively comprised of two pixels of transparent filters 23W, one pixel of a G filter 23G and one pixel of an R filter 23R or a B filter 23B.

In the color filter array 22 in which a plurality of the basic array patterns P1 are disposed in parallel, the transparent filters 23W are disposed in each pixel line (filter line) of the horizontal direction (H), the vertical direction (V) and the diagonal directions (NE and NW).

Here, NE, which indicates a lower-left to-upper-right diagonal direction, corresponds to one direction of a third direction and a fourth direction of the present invention. Further, NW, which indicates an upper-left-to-lower-right diagonal direction, corresponds to the other direction of the third direction and the fourth direction of the present invention. Because the RGBW filters 23R, 23G, 23B and 23W have a square shape, the NE direction and the NW direction are directions respectively tilted by 45° with respect to the horizontal direction and the vertical direction. It should be noted that this angle may increase or decrease according to increase or decrease of the length of each side of the RGBW filters 23R. 23G, 23B and 23W in the horizontal direction and in the vertical direction. For example, if color filters in a rectangular shape other than a square are used, the diagonal directions become diagonal (NE and NW directions). It should be noted that even if a color filter has a rectangular shape other than a square shape, if the color filters or pixels are disposed in a shape of a square lattice, the NE direction and the NW direction become directions respectively tilted by 45° with respect to the horizontal direction and the vertical direction.

As described above, because, in the color filter array 22, transparent filters 23W are disposed within each pixel line of the horizontal direction (H), the vertical direction (V) and the diagonal directions (NE and NW) of the color filter array 22, it is possible to perform sampling on brightness information in a high frequency range regardless of a direction of a high frequency in the input image. That is, because it is possible to perform sampling on brightness information of a high frequency, it is also possible to eliminate the need of an optical low-pass filter and improve sensitivity by a relatively large number of transparent filter pixels (W pixels).

Therefore, it is possible to obtain image data with excellent resolution by reducing occurrence of a false color (color moire) and omit an optical low-pass filter for reducing (suppressing) occurrence of a false color. It should be noted that even if an optical low-pass filter is applied, it is possible to apply an optical low-pass filter which poorly functions in cutting a high frequency component for preventing occurrence of a false color, so that it is possible to prevent degradation of resolution.

[Characteristics (3)]

Further, in the basic array pattern P1 of the color filter array 22 according to the present embodiment, a G filter 23G (second filter) corresponding to one pixel is disposed on each pixel line (filter horizontal array) extending in the horizontal direction and on each pixel line (filter vertical array) extending in the vertical direction.

The color G has a higher contribution ratio to obtain a brightness (Y) signal than the color R and the color B. That is, the contribution ratios of the color R and the color B are lower than the contribution ratio of the color G, and the color G contributes most to the brightness signal among the three primary colors. Because such G filters 23G are disposed within each pixel line of the horizontal direction (H) and the vertical direction (V) of the color filter array 22, it is possible to improve color reproduction precision of demosaicing processing in a high frequency range in the horizontal direction and in the vertical direction. It should be noted that, as one example, the above-described image processing unit 16 can generate a Y signal for each pixel from RGBW pixel signals having color information of all the RGB in accordance with the following equation (1).

$$Y=0.5W+0.5(0.3R+0.59G+0.11B) \quad \text{Equation (1)}$$

As described above, the color G (a color corresponding to the first visible light wavelength region) has a higher contribution ratio to obtain a brightness signal than the color R and the color B (a color corresponding to the second visible light wavelength region and a color corresponding to the third visible light wavelength region).

As described above, by disposing pixels G which have large influence on color reproducibility due to sensitivity characteristics of the human eye in the respective pixel lines extending in the horizontal direction and in the vertical direction, it is possible to improve color reproducibility.

[Characteristics (4)]

The numbers of pixels of the pixels R, the pixels G, the pixels B and the pixels W corresponding to the RGBW filters 23R, 23G, 23B and 23W within the basic array pattern P1 are respectively two pixels, four pixels, two pixels and eight pixels, and thus the ratio of the numbers of pixels of the RGBW pixels is 1:2:1:4 (the number of pixels W≥the number of pixels G≥the number of pixels R, and the number of pixels W≥the number of pixels G≥the number of pixels B). Therefore, the color filter array 22 according to the present embodiment includes G filters 23G twice as much as R filters 23R and B filters 23B and includes transparent filters 23W twice as much as G filters 23G (four times as much as R filters 23R and B filters 23B). Among the pixels RGBW, pixels W and pixels G relatively largely contribute to obtain a brightness signal. Therefore, in the color filter array 22, because the ratio of the numbers of pixels of the pixels W and the pixels G account for 12/16 (3/4) of the total, it is possible to effectively suppress aliasing upon demosaicing processing and realize favorable high frequency reproducibility.

[Characteristics (5)]

The basic array pattern P1 shown in (b) portion of FIG. 3 includes a "pixel line in which transparent filters 23W and G filters 23G are arranged", a "pixel line in which transparent filters 23W, G filters 23G and R filters 23R are arranged", a "pixel line in which transparent filters 23W, R filters 23R and B filters 23B are arranged" and a "pixel line in which transparent filters 23W, G filters 23G and B filters 23B are arranged" in the NW direction and in the NE direction at a ratio of 1:1:1:1.

That is, among four adjacent pixel lines extending in the NW direction and in the NE direction (diagonal pixel lines), the transparent filters 23W are included in all the diagonal pixel lines, the G filters 23G are included in 3/4 of the diagonal pixel lines, and the R filters 23R and the B filters 23B are included in 2/4 of the diagonal pixel lines. Particularly, each diagonal pixel line including R filters 23R and B filters 23B is disposed at a position adjacent to another diagonal pixel line including R filters 23R and B filters 23b of the same color. Here, a state where pixel lines are adjacent to each other in the diagonal direction means a state where pixel spacing between the pixel lines is √2/2 when a square filter whose length of one side is 1 is used. It should be noted that, typically, the pixel spacing refers to pixel spacing (pitch) from a center point of a reference pixel to a center point of an adjacent pixel.

If the RGBW filters 23R, 23G. 23B and 23W having such arrangement characteristics are disposed within the color filter array 22, because the RGB filters 23R. 23G and 23B are respectively disposed in close pixel lines extending in the diagonal directions (NE and NW), it is possible to effectively suppress color moire (false color) which may occur by the input image having high frequency components in the diagonal directions (NE and NW). Particularly, in this example, because all the diagonal pixel lines include transparent filters 23W, it is possible to obtain sharper image data.

[Characteristics (6)]

According to the color filter array 22 according to the present embodiment, R filters (pixels R) and B filters (pixels B) are respectively disposed adjacent to G filters (pixels G). That is, each of the pixels G is disposed at a pixel position adjacent to each of the pixels R and the pixels B on the left, right, upper or lower side (vertical direction/horizontal direction) or in the diagonal directions (adjacent positions in the vertical direction and in the diagonal directions in the present embodiment). By this means, pixels R and pixels B are uniformly disposed within the color filter array 22 (within the basic array pattern P1), so that it is possible to improve precision of demosaicing processing and realize favorable color reproducibility.

That is, if there is no color for interpolating a target pixel position of demosaicing processing around the target pixel position, because color reproducibility (precision of the demosaicing processing) degrades, it is preferable that pixels R, pixels G and pixels B are uniformly disposed in a scattered manner in the color filter array 22. Therefore, by disposing pixels R and pixels B adjacent to pixels G disposed so that one or more pixels of pixels G exist in each pixel line of the horizontal direction and the vertical direction, the pixels R and the pixels B are efficiently disposed in a scattered manner, so that it is possible to improve precision of the demosaicing processing.

[Characteristics (7)]

Further, in the color filter array 22 of the present embodiment, G filters (pixels G) are disposed in two or more pixels among eight pixels adjacent around each of pixels (pixels W, pixels R and pixels B) other than the pixels G. By this means, pixels G which have large influence on color reproducibility are disposed in a uniformly scattered manner, so that it is possible to improve color reproduction precision in demosaicing processing (interpolation processing) by two or more pixels G among eight pixels adjacent around each of the interpolation target pixels (pixels W, pixels R and pixels B) other than the pixels G.

Further, in the color filter array 22 of the present embodiment, pixels G are disposed in one or more pixels (one pixel in the diagonal direction in the present embodiment) among eight pixels adjacent around each of the pixels G. By this means, also concerning pixels G, because two pixels of pixels G are disposed in nine pixels comprised of a pixel G and eight pixels adjacent around the pixel G, it is possible to further improve color reproduction precision in demosaicing processing.

[Characteristics (8)]

Further, in the color filter array 22 of the present embodiment, because pixels W are disposed adjacent to "pixels G which have a high contribution ratio to brightness", it is possible to improve color reproduction precision at the positions of the pixels W in color interpolation processing (demosaicing processing) of the pixels W.

It should be noted that there are a plurality of basic array patterns other than the basic array pattern P1 shown in (a) portion of FIG. 3, which can configure the color filter array 22 shown in (b) portion of FIG. 3. That is, it is possible to configure color filters having an array equivalent to the color filter array 22 shown in (b) portion of FIG. 3 using an array pattern corresponding to 4×4 pixels obtained by shifting the basic array pattern shown in (a) portion of FIG. 3 in the horizontal direction and/or in the vertical direction as a basic array pattern.

As described above, because the color filter array 22 according to the present embodiment has the above-described characteristics, it is possible to simplify demosaicing processing in the subsequent stage, improve color reproduction precision of demosaicing processing in a high frequency range, suppress aliasing and improve high frequency reproducibility upon demosaicing processing and realize higher resolution and higher sensitivity.

Second Embodiment

FIG. 4 is a diagram showing a basic array pattern of color filters according to the second embodiment, and (a) portion shows one basic array pattern P2, and (b) portion shows a state where total of nine basic array patterns P2 are disposed, three in the horizontal direction and three in the vertical direction.

In the present embodiment, the explanation of the features which are the same as or similar to those in the above-described first embodiment will be omitted.

The array of color filters of the present embodiment is an array in which R filters 23R and B filters 23B in the color filters according to the first embodiment shown in FIG. 1 are inverted. That is, the positions of the R filters 23R in the color filter array according to the first embodiment correspond to the positions of the B filters 23B in the color filter array according to the second embodiment, and the positions of the B filters 23B in the color filter array according to the first embodiment correspond to the positions of the R filters 23R in the color filter array according to the second embodiment.

The color filter array 22 according to the present embodiment has the following characteristics.

[Characteristics (1)]

The color filter array 22 according to the present embodiment also includes a basic array pattern P2 which is a square array pattern corresponding to 4×4 pixels (M×N pixels) in the horizontal direction and in the vertical direction, and this basic array pattern P2 is repeatedly disposed in the horizontal direction and in the vertical direction. Therefore, in the color filter array 22, R filters 23R, G filters 23G, B filters 23B and transparent filters 23W are periodically arranged. It is thus possible to perform processing according to the repeating pattern when performing demosaicing processing or the like, on R, G and B signals, and it is possible to use a common processing circuit before and after thinning processing when reducing the size of an image by performing thinning processing in units of the basic array pattern P2.

[Characteristics (2)]

Also in the basic array pattern P2, four types of filter horizontal arrays extending in parallel in the horizontal direction are sequentially arranged in the vertical direction (see (a) portion of FIG. 4). The first filter horizontal array 25a is a "filter array in which a transparent filter 23W, a B filter 23B, a transparent filter 23W and a G filter 23G are disposed in parallel in the horizontal direction", the second filter horizontal array 25b is a "filter array in which a transparent filter 23W, a G filter 23G, a transparent filter 23W and a B filter 23B are disposed in parallel in the horizontal direction", the third filter horizontal array 25c is a "filter array in which an R filter 23R, a transparent filter 23W, a G filter 23G and a transparent filter 23W are disposed in parallel in the horizontal direction", and the fourth filter horizontal array 25d is a "filter array in which a G filter 23G, a transparent filter 23W, an R filter 23R and a transparent filter 23W are disposed in parallel in the horizontal direction". Therefore, in the basic array pattern P2 of this example, four types of filter vertical arrays extending in parallel in the vertical direction are formed.

Also in this basic array pattern P2, all the filter horizontal arrays and the filter vertical arrays respectively include two pixels of transparent filters 23W. Further, all the filter horizontal arrays and the filter vertical arrays respectively include one pixel of a G filter 23G. Further, all the filter horizontal arrays and the filter vertical arrays include one pixel of one of an R filter 23R and a B filter 23B. Therefore, each filter horizontal array and each filter vertical array in the basic array pattern P2 are respectively comprised of two pixels of transparent filters 23W, one pixel of a G filter 23G, one pixel of an R filter 23R or a B filter 23B.

In the color filter array 22 configured by disposing a plurality of the basic array patterns P2 in parallel, a transparent filter 23W is disposed in each pixel line (filter line) of the horizontal direction (H), the vertical direction (V) and the diagonal directions (NE and NW). By this means, it is possible to perform sampling of brightness information in a high frequency range regardless of a direction of a high frequency in the input image, so that it is possible to obtain image data with excellent resolution by reducing occurrence of a false color (color moire).

[Characteristics (3)]

Further, also in the basic array pattern P2 according to the present embodiment, because a G filter 23G (second filter) corresponding to one pixel is disposed on each filter horizontal array and on each filter vertical array, it is possible to improve color reproduction precision of demosaicing processing in a high frequency range in the horizontal direction and in the vertical direction.

[Characteristics (4)]

The number of pixels of pixels R, pixels G, pixels B and pixels W corresponding to the RGBW filters 23R. 23G, 23B and 23W within the basic array pattern P2 are respectively two pixels, four pixels, two pixels and eight pixels, and thus the ratio of the numbers of pixels of the RGBW pixels is 1:2:1:4. In this way, also in the color filter array 22 according to the present embodiment, because the ratio of the numbers of the pixels of pixels W and pixels G accounts for 12/16 (3/4) of the total, it is possible to suppress aliasing upon demosaicing processing and realize favorable high frequency reproducibility.

[Characteristics (5)]

Also in the color filter array 22 according to the present embodiment, among four adjacent pixel lines extending in the NW direction and in the NE direction (diagonal pixel lines), transparent filters 23W are included in all the diagonal pixel lines, G filters 23G are included in 3/4 of the diagonal pixel lines, and R filters 23R and B filters 23B are included in 2/4 of the diagonal pixel lines. Particularly, at a position adjacent to one side of each diagonal pixel line including R filters 23R and B filters 23B, another diagonal pixel line including R filters 23R and B filters 23B of the same color is disposed. Therefore, because RGB filters 23R, 23G and 23B are respectively disposed in close pixel lines extending in the diagonal directions (NE and NW), it is possible to effectively suppress color moire (false color) which may occur by the input image having high frequency components in the diagonal directions (NE and NW). Particularly, in this example, because transparent filters 23W are included in all the diagonal pixel lines, it is possible to obtain sharper image data.

[Characteristics (6)]

Also in the color filter array 22 according to the present embodiment, each of the pixels G is disposed at a pixel position adjacent to each of the R filters (pixels R) and the B filters (pixels B) on the left, right, upper or lower side (vertical direction/horizontal direction) or in the diagonal directions (adjacent positions in the vertical direction and in the diagonal directions in the present embodiment). By this means, pixels R and pixels B are uniformly disposed within the color filter array 22 (within the basic array pattern P2), so that it is possible to improve precision of demosaicing processing and realize favorable color reproducibility.

[Characteristics (7)]

Further, also in the color filter array 22 of the present embodiment, G filters (pixels G) are disposed in two or more pixels among eight pixels adjacent around each of pixels (pixels W, pixels R and pixels B) other than pixels G, so that pixels G are disposed in a uniformly scattered manner. Pixels G are disposed in one or more pixels (one pixel in the diagonal direction in the present embodiment) among eight pixels adjacent around each of the pixels G. By this means, it is possible to realize higher color reproduction precision in demosaicing processing.

[Characteristics (8)]

Further, also in the color filter array 22 of the present embodiment, because pixels W are disposed adjacent to "pixels G which have a high contribution ratio to brightness", it is possible to improve color reproduction precision at positions of the pixels W in color interpolation processing (demosaicing processing) of the pixels W.

It should be noted that there are a plurality of basic array patterns which can configure the color filter array 22 shown in (b) portion of FIG. 4, other than the basic array pattern P2 shown in (a) portion of FIG. 4. That is, it is also possible to use an array pattern corresponding to 4×4 pixels obtained by shifting the basic array pattern shown in (a) portion of FIG. 4 in the horizontal direction and/or in the vertical direction as a basic array pattern.

As described above, because the color filter array 22 according to the present embodiment has the above-described characteristics, it is possible to simplify demosaicing processing in the subsequent stage, improve color reproduction precision of demosaicing processing in a high frequency range, suppress aliasing and improve high frequency reproducibility upon demosaicing processing and realize higher resolution and higher sensitivity.

Third Embodiment

Figure 5:
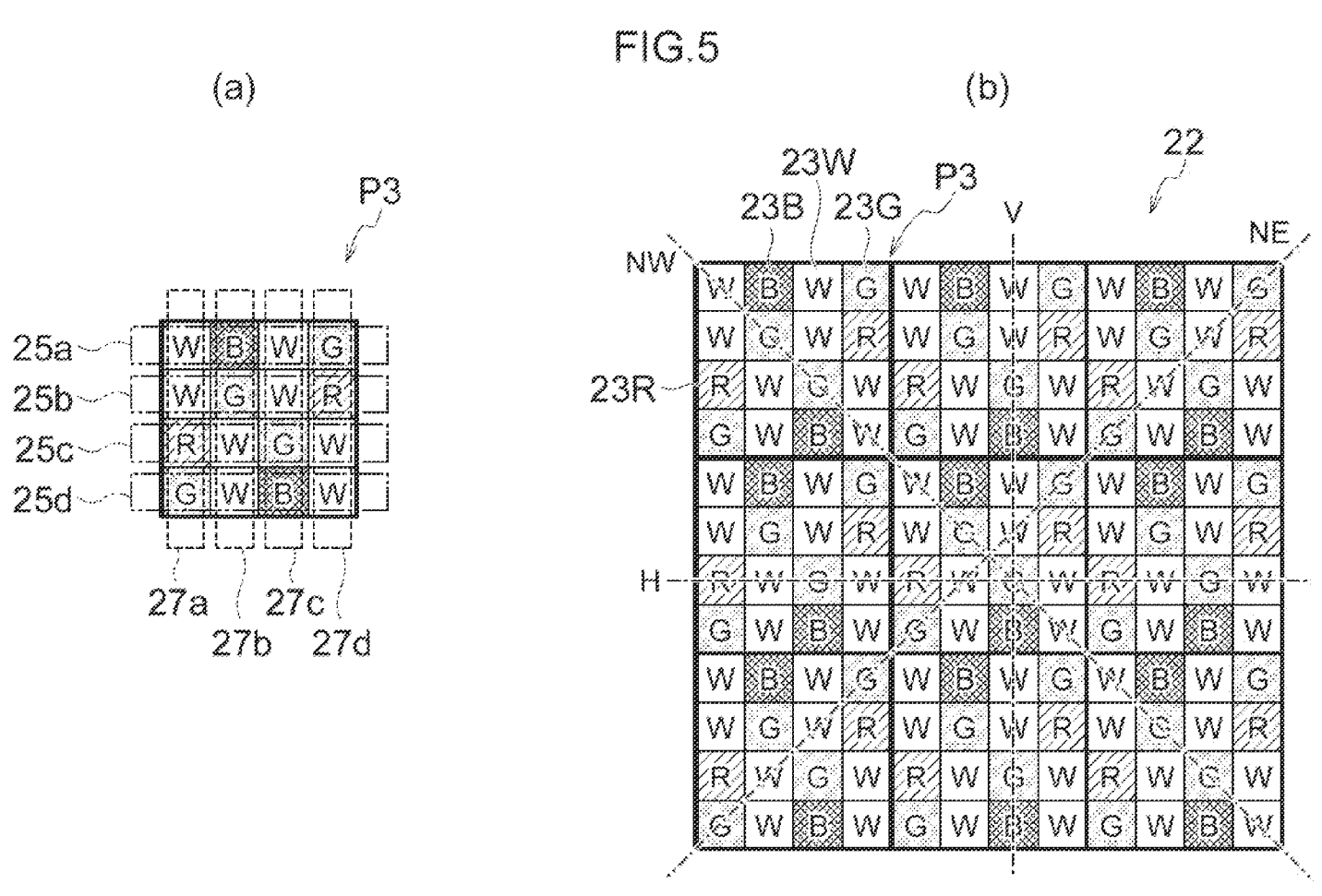

FIG. 5 is a diagram showing a basic array pattern of color filters according to the third embodiment, and (a) portion shows one basic array pattern P3, and (b) portion shows a state where total of nine basic array patterns P2 are disposed, three in the horizontal direction and three in the vertical direction.

In the present embodiment, the explanation of the features which are the same as or similar to those in the above-described first embodiment will be omitted.

In the basic array pattern P3 of the present embodiment, four types of pixel lines (a first filter horizontal array 25a, a second filter horizontal array 25b, a third filter horizontal array 25c and a fourth filter horizontal array 25d) extending in parallel in the horizontal direction are sequentially arranged in the vertical direction (see (a) portion of FIG. 5). The first filter horizontal array 25a is a "filter array in which a transparent filter 23W, a B filter 23B, a transparent filter 23W and a G filter 23G are disposed in parallel in the horizontal direction", the second filter horizontal array 25b is a "filter array in which a transparent filter 23W, a G filter 23G, a transparent filter 23W and an R filter 23R are disposed in parallel in the horizontal direction", the third filter horizontal array 25c is a "filter array in which an R filter 23R, a transparent filter 23W, a G filter 23G and a transparent filter 23W are disposed in parallel in the horizontal direction", and the fourth filter horizontal array 25d is a "filter array in which a G filter 23G, a transparent filter 23W, a B filter 23B and a transparent filter 23W are disposed in parallel in the horizontal direction". With these filter arrays, in the basic array pattern P3 according to the present embodiment, four types of pixel lines (a first filter vertical array 27a, a second filter vertical array 27b, a third filter vertical array 27c and a fourth filter vertical array 27d) extending in parallel in the vertical direction are formed.

The color filter array 22 according to the present embodiment has the following characteristics.

[Characteristics (1)]

The color filter array 22 according to the present embodiment also includes a basic array pattern P3 which is a square array pattern corresponding to 4×4 pixels (M×N pixels) in the horizontal direction and in the vertical direction, and this basic array pattern P3 is repeatedly disposed in the horizontal direction and in the vertical direction. Therefore, in the color filter array 22, R filters 23R, G filters 23G, B filters 23B and transparent filters 23W are periodically arranged. It is thus possible to perform processing according to the repeating pattern when performing demosaicing processing or the like, on R, G and B signals, and it is possible to use a common processing circuit before and after thinning processing when reducing the size of an image by performing thinning processing in units of the basic array pattern P3.

[Characteristics (2)]

Also in the basic array pattern P3 of the present embodiment, all the filter horizontal arrays and the filter vertical arrays respectively include two pixels of transparent filters 23W. Further, all the filter horizontal arrays and the filter vertical arrays respectively include one pixel of a G filter 23G. Still further, all the filter horizontal arrays and the filter vertical arrays include one pixel of one of an R filter 23R and a B filter 23B. Therefore, each filter horizontal array and each filter vertical array in the basic array pattern P3 are respectively comprised of two pixels of transparent filters 23W, one pixel of a G filter 23G and one pixel of an R filter 23R or a B filter 23B.

In the color filter array 22 configured by disposing a plurality of the basic array patterns P3 in parallel, transparent filters 23W are disposed within each pixel line (filter line) of the horizontal direction (H), the vertical direction (V) and the diagonal directions (NE and NW). By this means, it is possible to perform sampling of brightness information in a high frequency range regardless of a direction of a high frequency in the input image and it is possible to obtain image data with excellent resolution by reducing occurrence of a false color (color moire).

[Characteristics (3)]

Further, also in the basic array pattern P3 according to the present embodiment, because a G filter 23G (second filter) corresponding to one pixel is disposed on each filter horizontal array and each filter vertical array, it is possible to improve color reproduction precision of demosaicing processing in a high frequency range in the horizontal direction and in the vertical direction.

[Characteristics (4)]

The numbers of pixels of the pixels R, the pixels G, the pixels B and the pixels W corresponding to the RGBW filters 23R, 23G, 23B and 23W within the basic array pattern P3 are respectively two pixels, four pixels, two pixels and eight pixels, and thus the ratio of the numbers of pixels of the RGBW pixels is 1:2:1:4. In this way, because also in the color filter array 22 according to the present embodiment, the ratio of the numbers of pixels of the pixels W and the pixels G accounts for 12/16 (3/4) of the total, it is possible to suppress aliasing upon demosaicing processing and realize favorable high frequency color reproducibility.

[Characteristics (5)]

Also in the color filter array 22 according to the present embodiment, among four adjacent pixel lines extending in the NW direction and in the NE direction (diagonal pixel lines), transparent filters 23W are included in all the diagonal pixel lines, G filters 23G are included in 3/4 of the diagonal pixel lines, and R filters 23R and B filters 23B are included in 2/4 of the diagonal pixel lines or 1/4 of the diagonal pixel lines. Therefore, because the RGB filters 23R, 23G and 23B are respectively disposed in close pixel lines extending in the diagonal directions (NE and NW), it is possible to effectively suppress color moire (false color) which may occur by the input image having high frequency components in the diagonal directions (NE and NW). Particularly, in this example, because transparent filters 23W are included in all the diagonal pixel lines, it is possible to obtain sharper image data.

[Characteristics (6)]

Also in the color filter array 22 according to the present embodiment, each of the pixels G is disposed at a pixel position adjacent to each of the R filters (pixels R) and the B filters (pixels B) on the left, right, upper or lower side (vertical direction/horizontal direction) or in the diagonal directions (adjacent positions in the vertical direction and in the diagonal directions in the present embodiment). By this means, pixels R and pixels B are uniformly disposed within the color filter array 22 (within the basic array pattern P3), so that it is possible to improve precision of demosaicing processing and realize favorable color reproducibility.

[Characteristics (7)]

Further, also in the color filter array 22 of the present embodiment, G filters (pixels G) are disposed in two or more pixels among eight pixels adjacent around each of pixels (pixels W, pixels R and pixels B) other than the pixels G, so that pixels G are disposed in a uniformly scattered manner. Further, pixels G are disposed in one or more pixels among eight pixels adjacent around each of the pixels G (one pixel in the diagonal direction in the present embodiment). By this means, it is possible to further improve color reproduction precision in demosaicing processing.

[Characteristics (8)]

Further, also in the color filter array 22 of the present embodiment, because pixels W are disposed adjacent to "pixels G which have a high contribution ratio to brightness", it is possible to improve color reproduction precision at the positions of the pixels W in color interpolation processing (demosaicing processing) of the pixels W.

It should be noted that there are a plurality of basic array patterns which can configure the color filter array 22 shown in (b) portion of FIG. 5, other than the basic array pattern P3 shown in (a) portion of FIG. 5. That is, it is also possible to use the array pattern corresponding to 4×4 pixels obtained by shifting the basic array pattern shown in (a) portion of FIG. 5 in the horizontal direction and/or in the vertical direction as the basic array pattern.

As described above, because the color filter array 22 according to the present embodiment has the above-described characteristics, it is possible to simplify demosaicing processing in the subsequent stage, improve color reproduction precision of demosaicing processing in a high frequency range, suppress aliasing and improve high frequency reproducibility upon demosaicing processing and realize higher resolution and higher sensitivity.

Embodiment 4

FIG. 6 is a diagram showing a basic array pattern of color filters according to the fourth embodiment, and (a) portion shows one basic array pattern P4, and (b) portion shows a state where total of nine basic array patterns P2 are disposed, three in the horizontal direction and three in the vertical direction.

In the present embodiment, the explanation of the features which are the same as or similar to those in the above-described embodiments will be omitted.

The array of the color filters of the present embodiment is an array in which R filters 23R and B filters 23B of the color filters according to the third embodiment shown in FIG. 5 are inverted. Therefore, the positions of the R filters 23R in the color filter array according to the third embodiment correspond to the positions of the B filters 23B in the color filter array according to the fourth embodiment, and the positions of the B filters 23B in the color filter array according to the third embodiment correspond to the positions of the R filter 23R in the color filter array according to the fourth embodiment.

That is, in the basic array pattern P4 of the present embodiment, four types of pixel lines (a first filter horizontal array 25a, a second filter horizontal array 25b, a third filter horizontal array 25c and a fourth filter horizontal array 25d) extending in parallel in the horizontal direction are sequentially arranged in the vertical direction (see (a) portion of FIG. 6). The first filter horizontal array 25a is a "filter array in which a transparent filter 23W, an R filter 23R, a transparent filter 23W and a G filter 23G are disposed in parallel in the horizontal direction", the second filter horizontal array 25b is a "filter array in which a transparent filter 23W, a G filter 23G, a transparent filter 23W and a B filter 23B are disposed in parallel in the horizontal direction", the third filter horizontal array 25c is a "filter array in which a B filter 23B, a transparent filter 23W, a G filter 23G and a transparent filter 23W are disposed in parallel in the horizontal direction", and the fourth filter horizontal array 25d is a "filter array in which a G filter 23G, a transparent filter 23W, an R filter 23R and a transparent filter 23W are disposed in parallel in the horizontal direction". With these filter arrays, in the basic array pattern P4 according to the present embodiment, four types of pixel lines (a first filter vertical array 27a, a second filter vertical array 27b, a third filter vertical array 27c and a fourth filter vertical array 27d) extending in parallel in the vertical direction are formed.

The color filter array 22 according to the present embodiment has the following characteristics.

[Characteristics (1)]

The color filter array 22 according to the present embodiment also includes a basic array pattern P4 which is a square array pattern corresponding to 4×4 pixels (M×N pixels) in the horizontal direction and in the vertical direction, and this basic array pattern P4 is repeatedly disposed in the horizontal direction and in the vertical direction. Therefore, in the color filter array 22, R filters 23R, G filters 23G. B filters 23B and transparent filters 23W are periodically arranged. It is thus possible to perform processing according to the repeating pattern when performing demosaicing processing or the like, on R. G and B signals, and it is possible to use a common processing circuit before and after thinning processing when reducing the size of an image by performing thinning processing in units of the basic array pattern P4.

[Characteristics (2)]

Also in the basic array pattern P4 of the present embodiment, all the filter horizontal arrays and the filter vertical arrays respectively include two pixels of transparent filters 23W. Further, all the filter horizontal arrays and the filter vertical arrays respectively include one pixel of a G filter 23G. Still further, all the filter horizontal arrays and the filter vertical arrays include one pixel of one of an R filter 23R and a B filter 23B. Therefore, each filter horizontal array and each filter vertical array in the basic array pattern P4 are respectively comprised of two pixels of transparent filters 23W, one pixel of a G filter 23G and one pixel of an R filter 23R or a B filter 23B.

In the color filter array 22 configured by disposing a plurality of the basic array patterns P4 in parallel, transparent filters 23W are disposed within each pixel line (filter line) of the horizontal direction (H), the vertical direction (V) and the diagonal directions (NE and NW). By this means, it is possible to perform sampling of brightness information in a high frequency range regardless of a direction of a high frequency in the input image and it is possible to obtain image data with excellent resolution by reducing occurrence of a false color (color moire).

[Characteristics (3)]

Further, also in the basic array pattern P4 according to the present embodiment, because a G filter 23G (second filter) corresponding to one pixel is disposed on each filter horizontal array and on each filter vertical array, it is possible to improve color reproduction precision of demosaicing processing in a high frequency range in the horizontal direction and in the vertical direction.

[Characteristics (4)]

The numbers of pixels of the pixels R, the pixels G, the pixels B and the pixels W corresponding to RGBW filters 23R. 23G, 23B and 23W within the basic array pattern P4 are respectively two pixels, four pixels, two pixels and eight pixels, and thus the ratio of the numbers of pixels of the RGBW pixels is 1:2:1:4. In this way, also in the color filter array 22 according to the present embodiment, because the ratio of the numbers of pixels of the pixels W and the pixels G accounts for 12/16 (3/4) of the total, it is possible to suppress aliasing upon demosaicing processing and realize favorable high frequency reproducibility.

[Characteristics (5)]

Also in the color filter array 22 according to the present embodiment, among four adjacent pixel lines extending in the NW direction and in the NE direction (diagonal pixel lines), transparent filters 23W are included in all the diagonal pixel lines. G filters 23G are included in 3/4 of the diagonal pixel lines, and R filters 23R and B filters 23B are included in 2/4 of the diagonal pixel lines or 1/4 of the diagonal pixel lines. Therefore, because the RGB filters 23R, 23G and 23B are respectively disposed in close pixel lines extending in the diagonal directions (NE and NW), it is possible to effectively suppress color moire (false color) which may occur by the input image having high frequency components in the diagonal directions (NE and NW). Particularly, because transparent filters 23W are included in all the diagonal pixel lines, it is possible to obtain sharper image data.

[Characteristics (6)]

Also in the color filter array 22 according to the present embodiment, each of the pixels G is disposed at a pixel position adjacent to each of the R filters (pixels R) and the B filters (pixels B) on the left, right, upper or lower side (vertical direction/horizontal direction) or in the diagonal directions (adjacent positions in the vertical direction and in the diagonal directions in the present embodiment). By this means, pixels R and pixels B are uniformly disposed within the color filter array 22 (within the basic array pattern P4), so that it is possible to improve precision of demosaicing processing and realize favorable color reproducibility.

[Characteristics (7)]

Further, also in the color filter array 22 of the present embodiment, G filters (pixels G) are disposed in two or more pixels among eight pixels adjacent around each of pixels (pixels W, pixels R and pixels B) other than the pixels G, so that pixels G are disposed in a uniformly scattered manner. Further, pixels G are disposed in one or more pixels (one pixel in the diagonal direction in the present embodiment) among eight pixels adjacent around each of the pixels G. By this means, it is possible to further improve color reproduction precision in demosaicing processing.

[Characteristics (8)]

Further, also in the color filter array 22 of the present embodiment, because pixels W are disposed adjacent to "pixels G which have a high contribution ratio to brightness", it is possible to improve color reproduction precision at the positions of the pixels W in color interpolation processing (demosaicing processing) of the pixels W.

It should be noted that there are a plurality of basic array patterns which can configure the color filter array 22 shown in (b) portion of FIG. 6, other than the basic array pattern P4 shown in (a) portion of FIG. 6. That is, it is also possible to use an array pattern corresponding to 4×4 pixels obtained by shifting the basic array pattern shown in (a) portion of FIG. 6 in the horizontal direction and/or in the vertical direction as a basic array pattern.

As described above, because the color filter array 22 according to the present embodiment has the above-described characteristics, it is possible to simplify demosaicing processing in the subsequent stage, improve color reproduction precision of demosaicing processing in a high frequency range, suppress aliasing and improve high frequency reproducibility upon demosaicing processing and realize higher resolution and higher sensitivity.

Fifth Embodiment

Figure 7:
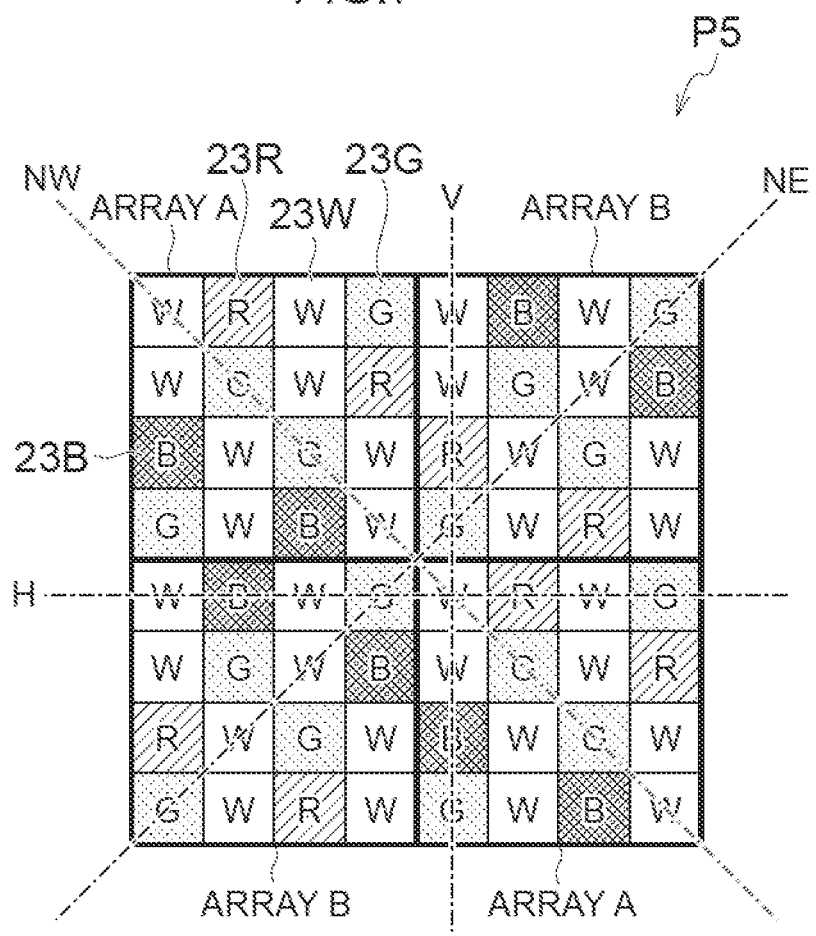
FIG. 7 is a diagram showing a basic array pattern of color filters according to a fifth embodiment.

FIG. 7 is a diagram showing a basic array pattern P5 of color filters according to the fifth embodiment.

In the present embodiment, the explanation of the features which are the same as or similar to those in the above-described embodiments will be omitted.

The basic array pattern P5 of the color filter array according to the present embodiment includes two first sub-arrays and two second sub-arrays which are two types of sub-arrays, the first sub-array (array A) being the basic array pattern P1 according to the first embodiment see (a) portion of FIG. 3), and the second sub-array (array B being the basic array pattern P2 according to the second embodiment (see (a) portion of FIG. 4). Therefore, the positions of the R filters 23R in the first sub-array correspond to the positions of the B filters 23B in the second sub-array, and the positions of the B filters 23B in the first sub-array correspond to the positions of the R filters 23R in the second sub-array.

In the basic array pattern P5, the first sub-arrays (arrays A) and the second sub-arrays (arrays B) are disposed adjacent to each other in each direction of the horizontal direction and the vertical direction, so that the basic array pattern P5 corresponds to 8×8 pixels in the horizontal direction and in the vertical direction as a whole.

The color filter array 22 according to the present embodiment has the following characteristics.
[Characteristics (1)]

The color filter array 22 according to the present embodiment includes a basic array pattern P5 which is a square array pattern corresponding to 8×8 pixels (M×N pixels) in the horizontal direction and in the vertical direction, and this basic array pattern P5 is repeatedly disposed in the horizontal direction and in the vertical direction. Therefore, in the color filter array 22, R filters 23R, G filters 23G, B filters 23B and transparent filters 23W are periodically arranged. It is thus possible to perform processing according to the repeating pattern when performing demosaicing processing or the like, on R, G and B signals and it is possible to use a common processing circuit before and after thinning processing when reducing the size of an image by performing thinning processing in units of the basic array pattern P5.
[Characteristics (2)]

In the basic array pattern P5 according to the present embodiment, eight types of filter horizontal arrays extending in parallel in the horizontal direction are sequentially arranged in the vertical direction, which forms eight types of filter vertical arrays extending in parallel in the vertical direction.

In the basic array pattern P5, all the filter horizontal arrays and the filter vertical arrays respectively include four pixels of transparent filters 23W. Further, all the filter horizontal arrays and the filter vertical arrays respectively include two pixels of G filters 23G. Still further, all the filter horizontal arrays and the filter vertical arrays respectively include one pixel of an R filter 23R. Further, all the filter horizontal arrays and the filter vertical arrays respectively include one pixel of a B filter 23B. Therefore, each filter horizontal array and each filter vertical array in the basic array pattern P5 are respectively comprised of four pixels of transparent filters 23W, two pixels of G filters 23G, one pixel of an R filter 23R and one pixel of a B filter 23B.

In the color filter array configured by disposing a plurality of the basic array pattern P5 in parallel, transparent filters 23W are disposed within each pixel line (filter line) of the horizontal direction (H), the vertical direction (V) and the diagonal directions (NE and NW). By this means, it is possible to perform sampling of brightness information in a high frequency range regardless of a direction of a high frequency in the input image and it is possible to obtain image data with excellent resolution by reducing occurrence of a false color (color moire).
[Characteristics (3)]

Further, in the basic array pattern P5 according to the present embodiment, because G filters 23G (second filter) corresponding to two pixels are disposed on each filter horizontal array and on each filter vertical array, it is possible to improve color reproduction precision of demosaicing processing in a high frequency range in the horizontal direction and in the vertical direction.

Particularly, in the basic array pattern P5 according to the present embodiment, an R filter 23R (third filter) and a B filter 23B (fourth filter) respectively corresponding to one pixel are disposed on each filter horizontal array and on each filter vertical array. Therefore, it is possible to improve color reproduction precision of demosaicing processing in a high frequency range in the horizontal direction and in the vertical direction not only for a color G corresponding to the G filters, but also a color R and a color B respectively corresponding to the R filters (pixels R) and the B filters (pixels B). Accordingly, it is possible to improve color reproduction precision in a high frequency range for all the colors of the three primary colors, so that it is possible to acquire data of a sharp image with extremely high resolution.
[Characteristics (4)]

The numbers of pixels of the pixels R, the pixels G, the pixels B and the pixels W corresponding to the RGBW filters 23R, 23G, 23B and 23W within the basic array pattern P5 are respectively eight pixels, sixteen pixels, eight pixels and thirty-two pixels, and thus the ratio of the numbers of pixels of the RGBW pixels is 1:2:1:4 (the number of pixels W≥the number of pixels G≥the number of pixels R the number of pixels W≥the number of pixels G≥the number of pixels B). In this way, also in the color filter array 22 according to the present embodiment, the ratio of the numbers of pixels of the pixels W and the pixels G accounts for 48/64 (3/4) of the total, it is possible to suppress aliasing upon demosaicing processing and realize favorable high frequency reproducibility.
[Characteristics (5)]

Also in the color filter array 22 according to the present embodiment, among adjacent eight pixel lines extending in the NW direction and in the NE direction (diagonal pixel lines), transparent filters 23W are included in all the diagonal pixel lines, and G filters 23G are included in 6/8 of the diagonal pixel lines. Further, at a position adjacent to at least one side of each diagonal pixel line including R filters 23R and B filters 23B, another diagonal pixel line including R filters 23R and B filters 23B of the same color is disposed. Therefore, because RGB filters 23R, 23G and 23B are respectively disposed in close pixel lines extending in the diagonal directions (NE and NW), it is possible to effectively suppress color moire (false color) which may occur by the input image having high frequency components in the diagonal directions (NE and NW). Particularly, in this example, because transparent filters 23W are included in all the diagonal pixel lines, it is possible to obtain sharper image data.

[Characteristics (6)]

Also in the color filter array 22 according to the present embodiment, each of the pixels G is disposed at a pixel position adjacent to each of the R filters (pixels R) and the B filters (pixels B) on the left, right, upper or lower side (vertical direction/horizontal direction) or in the diagonal directions (adjacent positions in the vertical direction and in the diagonal directions in the present embodiment). By this means, pixels R and pixels B are uniformly disposed within the color filter array 22 (within the basic array pattern P5), so that it is possible to improve precision of demosaicing processing and realize favorable color reproducibility. Further, in the basic array pattern, the positions of the R filters 23R in the first sub-array correspond to the positions of the B filters 23B in the second sub-array, and the positions of the B filters 23B in the first sub-array correspond to the positions of the R filters 23R in the second sub-array, and the W filters 23W and the G filters 23G are disposed at the same positions in the first sub-array and the second sub-array. Therefore, it is possible to prevent demosaicing processing from becoming complicated even if the size of the basic array pattern becomes large.

[Characteristics (7)]

Further, also in the color filter array 22 of the present embodiment, G filters (pixels G) are disposed in two or more pixels among eight pixels adjacent around each of pixels (pixels W, pixels R and pixels B) other than the pixels G, so that pixels G are disposed in a uniformly scattered manner. Further, pixels G are disposed in one or more pixels among eight pixels adjacent around each of the pixels G. By this means, it is possible to improve color reproduction precision in demosaicing processing.

[Characteristics (8)]

Further, also in the color filter array 22 of the present embodiment, because pixels W are disposed adjacent to "pixels G which have a high contribution ratio to brightness", it is possible to improve color reproduction precision at positions of the pixels W in color interpolation processing (demosaicing processing) of the pixels W.

It should be noted that the color filter array 22 configured using the basic array pattern P5 shown in FIG. 7 can be also configured using other basic array patterns, and an array pattern corresponding to 8×8 pixels obtained by shifting the basic array pattern shown in FIG. 7 in the horizontal direction and/or in the vertical direction may be used as a basic array pattern.

As described above, because the color filter array 22 according to the present embodiment has the above-described characteristics, it is possible to simplify demosaicing processing in the subsequent stage, improve color reproduction precision of demosaicing processing in a high frequency range, suppress aliasing and improve high frequency reproducibility upon demosaicing processing and realize higher resolution and higher sensitivity. Particularly, because R filters 23R and B filters 23B are also disposed in each filter horizontal array and each filter vertical array, the color filter array 22 according to the present embodiment excels in high frequency reproducibility in the horizontal direction and in the vertical direction.

Sixth Embodiment

Figure 8:
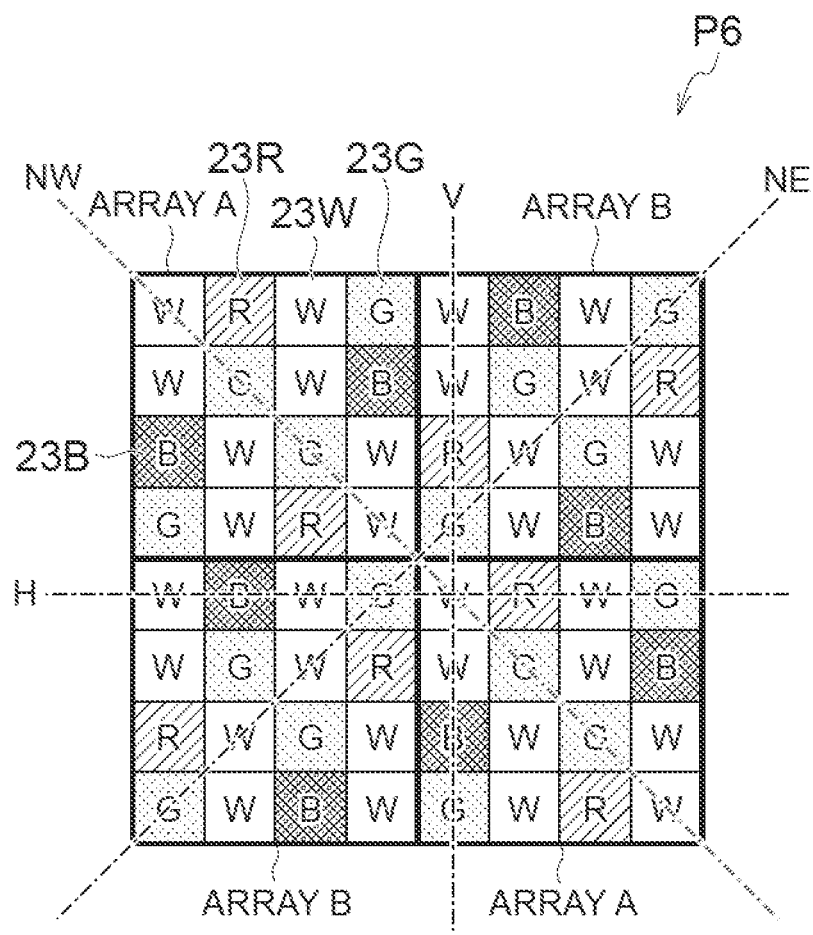
FIG. 8 is a diagram showing a basic array pattern of color filters according to a sixth embodiment.

FIG. 8 is a diagram showing a basic array pattern P6 of color filters according to the sixth embodiment.

In the present embodiment, the explanation of the features which are the same as or similar to those in the above-described embodiments will be omitted.

The basic array pattern P6 of the color filter array according to the present embodiment includes two first sub-arrays and two second sub-arrays which are two types of sub-arrays, the first sub-array (array A) being the basic array pattern P4 according to the fourth embodiment see (a) portion of FIG. 6), and the second sub-array (array B being the basic array pattern P3 according to the third embodiment (see (a) portion of FIG. 5). Therefore, the positions of the R filters 23R in the first sub-array correspond to the positions of the B filters 23B in the second sub-array, and the positions of the B filters 23B in the first sub-array correspond to the positions of the R filters 23R in the second sub-array.

In the basic array pattern P6, the first sub-arrays (arrays A) and the second sub-arrays (arrays B) are disposed adjacent to each other in each direction of the horizontal direction and the vertical direction, so that the basic array pattern P6 corresponds to 8×8 pixels in the horizontal direction and in the vertical direction as a whole.

The color filter array 22 according to the present embodiment has the following characteristics.

[Characteristics (1)]

The color filter array 22 according to the present embodiment includes a basic array pattern P6 which is a square array pattern corresponding to 8×8 pixels (M×N pixels) in the horizontal direction and in the vertical direction, and the basic array pattern P6 is repeatedly disposed in the horizontal direction and in the vertical direction. Therefore, in the color filter array 22, R filters 23R, G filters 23G, B filters 23B and transparent filters 23W are periodically arranged. It is thus possible to perform processing according to the repeating pattern when performing demosaicing processing or the like, on R, G and B signals, and it is possible to use a common processing circuit before and after thinning processing when reducing the size of an image by performing thinning processing in units of the basic array pattern P6.

[Characteristics (2)]

In the basic array pattern P6 according to the present embodiment, eight types of filter horizontal arrays extending in parallel in the horizontal direction are sequentially arranged in the vertical direction, which forms eight types of filter vertical arrays extending in parallel in the vertical direction.

In the basic array pattern P6, all the filter horizontal arrays and the filter vertical arrays respectively include four pixels of transparent filters 23W. Further, all the filter horizontal arrays and the filter vertical arrays respectively include two pixels of G filters 23G. Still further, all the filter horizontal arrays and the filter vertical arrays respectively include one pixel of an R filter 23R. Further, all the filter horizontal arrays and the filter vertical arrays respectively include one pixel of a B filter 23B. Therefore, each filter horizontal array and each filter vertical array in the basic array pattern P6 are respectively comprised of four pixels of transparent filters 23W, two pixels of G filters 23G, one pixel of an R filter 23R and one pixel of a B filter 23B.

In the color filter array 22 configured by disposing a plurality of the basic array patterns P6 in parallel, transparent filters 23W are disposed within each pixel line (filter line) of the horizontal direction (H), the vertical direction (V) and the diagonal directions (NE and NW). By this means, it is possible to perform sampling of brightness information in a high frequency range regardless of a direction of a high frequency in the input image, and it is possible to obtain image data with excellent resolution by reducing occurrence of a false color (color moire).

[Characteristics (3)]

Further, in the basic array pattern P6 according to the present embodiment, because G filters 23G (second filter) corresponding to two pixels are disposed on each filter horizontal array and on each filter vertical array, it is possible to improve color reproduction precision of demosaicing processing in a high frequency range in the horizontal direction and in the vertical direction.

Particularly, in the basic array pattern P6 according to the present embodiment, an R filter 23R (third filter) and a B filter 23B (fourth filter) respectively corresponding to one pixel are disposed on each filter horizontal array and on each filter vertical array. Therefore, it is possible to improve color reproduction precision of demosaicing processing in a high frequency range in the horizontal direction and in the vertical direction for not only a color G corresponding to the G filters 23G, but also a color R and a color B respectively corresponding to the R filers (pixels R) and the B filters (pixels B). Accordingly, it is possible to improve color reproduction precision in a high frequency range for all the colors of the three primary colors, so that it is possible to acquire data of a sharp image with extremely high resolution.

[Characteristics (4)]

The numbers of pixels of the pixels IL the pixels G, the pixels B and the pixels W corresponding to the RGBW filters 23R, 23G, 23B and 23W within the basic array pattern P6 are respectively eight pixels, sixteen pixels, eight pixels and thirty-two pixels, and thus the ratio of the numbers of pixels of the RGBW pixels is 1:2:1:4 (the number of pixels W≥the number of pixels G≥the number of pixels R the number of pixels W≥the number of pixels G≥the number of pixels B). In this way, also in the color filter array 22 according to the present embodiment, because the ratio of the numbers of pixels of the pixels W and the pixels G accounts for 48/64 (3/4) of the total, it is possible to suppress aliasing upon demosaicing processing and realize favorable high frequency reproducibility.

[Characteristics (5)]

Also in the color filter array 22 according to the present embodiment, among adjacent eight pixel lines extending in the NW direction and in the NE direction (diagonal pixel lines), transparent filters 23W are included in all the diagonal pixel lines, and G filters 23G are included in 6/8 of the diagonal pixel lines. Further, at a position adjacent to at least one side of each diagonal pixel line including R filters 23R and B filters 23B, another diagonal pixel line including R filters 23R and B filters 23B of the same color is disposed. Therefore, because RGB filters 23R, 23G and 23B are respectively disposed in close pixel lines extending in the diagonal directions (NE and NW), it is possible to effectively suppress color moire (false color) which may occur by the input image having high frequency components in the diagonal directions (NE and NW). Particularly, in this example, because transparent filters 23W are included in all the diagonal pixel lines, it is possible to obtain sharper image data.

[Characteristics (6)]

Also in the color filter array 22 according to the present embodiment, each of the pixels G is disposed at a pixel position adjacent to each of the R filters (pixels R) and the B filters (pixels B) on the left, right, upper or lower side (vertical direction/horizontal direction) or in the diagonal directions (adjacent positions in the vertical direction and in the diagonal directions in the present embodiment). By this means, pixels R and pixels B are uniformly disposed within the color filter array 22 (within the basic array pattern P6), so that it is possible to improve precision of demosaicing processing and realize favorable color reproducibility. Further, in the basic array pattern, the positions of the R filters 23R in the first sub-array correspond to the positions of the B filters 23B in the second sub-array, and the positions of the B filters 23B in the first sub-array correspond to the positions of the R filters 23R in the second sub-array, and the W filters 23W and the G filters 23G are disposed at the same positions in the first sub-array and the second sub-array. Therefore, it is possible to prevent demosaicing processing from becoming complicated even if the size of the basic array pattern becomes large.

[Characteristics (7)]

Further, also in the color filter array 22 of the present embodiment, G filters (pixels G) are disposed in two or more pixels among eight pixels adjacent around each of pixels (pixels W, pixels R and pixels B) other than the pixels G, so that pixels G are disposed in a uniformly scattered manner. Further, pixels G are disposed in one or more pixels among eight pixels adjacent around each of the pixels G. By this means, it is possible to improve color reproduction precision in demosaicing processing.

[Characteristics (8)]

Further, also in the color filter array 22 of the present embodiment, because pixels W are disposed adjacent to "pixels G which have a high contribution ratio to brightness", it is possible to improve color reproduction precision at positions of the pixels W in color interpolation processing (demosaicing processing) of the pixels W.

It should be noted that the color filter array 22 configured using the basic array pattern P6 shown in FIG. 8 can be also configured using other basic array patterns, and an array pattern corresponding to 8×8 pixels obtained by shifting the basic array pattern shown in FIG. 8 in the horizontal direction and/or in the vertical direction may be used as a basic array pattern.

As described above, because the color filter array 22 according to the present embodiment has the above-described characteristics, it is possible to simplify demosaicing processing in the subsequent stage, improve color reproduction precision of demosaicing processing in a high frequency range, suppress aliasing and improve high frequency reproducibility upon demosaicing processing and realize higher resolution and higher sensitivity. Particularly, because R filters 23R and B filters 23B are also disposed in each filter horizontal array and each filter vertical array, the color filter array 22 according to the present embodiment excels in high frequency reproducibility in the horizontal direction and in the vertical direction.

Seventh Embodiment

Figure 9:
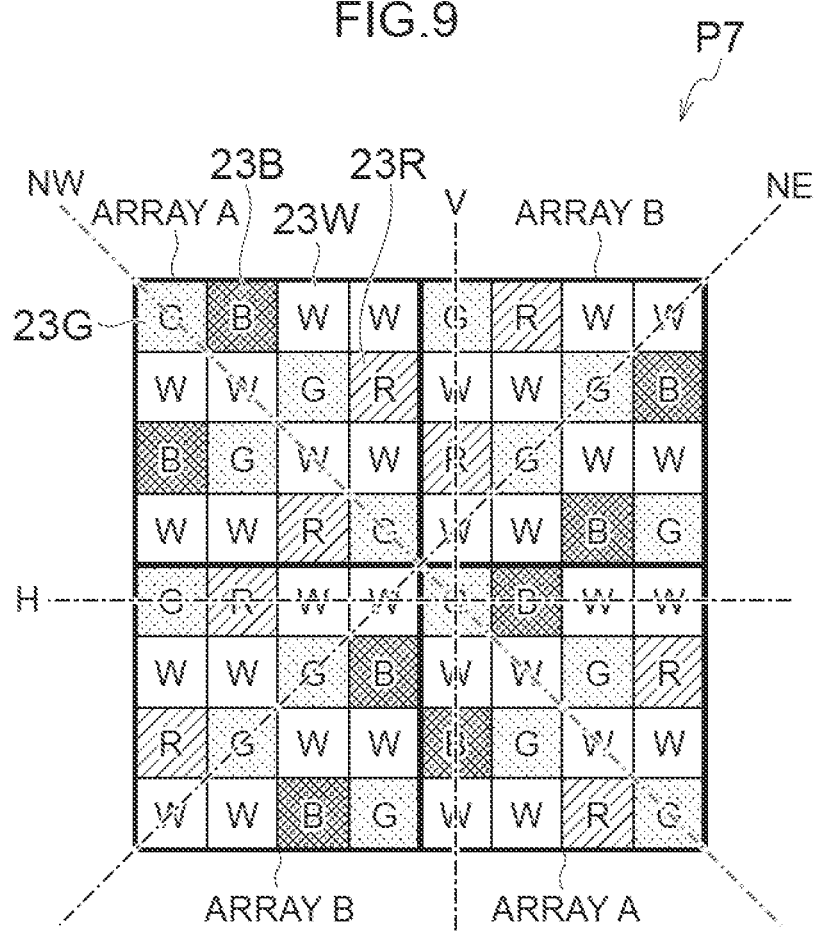
FIG. 9 is a diagram showing a basic array pattern of color filters according to a seventh embodiment.

FIG. 9 is a diagram showing a basic array pattern P7 of a color filter according to the seventh embodiment.

In the present embodiment, the explanation of the features which are the same as or similar to those in the above-described embodiments will be omitted.

The basic array pattern P7 of the color filter array according to the present embodiment includes two first sub-arrays and two second sub-arrays which are two types of sub-arrays, the first sub-array (array A) being an array pattern obtained by rotating the basic array pattern P1 according to the first embodiment (see (a) portion of FIG. 3) by 90 degrees, and the second sub-array (array B) being an array pattern obtained by rotating the basic array pattern P2 according to the second embodiment (see (a) portion of FIG. 4) by 90 degrees.

That is, in the first sub-array, a "filter horizontal array in which a G filter 23G, a B filter 23B, a transparent filter 23W and a transparent filter 23W are disposed in parallel in the horizontal direction", a "filter horizontal array in which a transparent filter 23W, a transparent filter 23W, a G filter 23G and an R filter 23R are disposed in parallel in the horizontal direction", a "filter horizontal array in which a B filter 23B, a G filter 23G, a transparent filter 23W and a transparent filter 23W are disposed in parallel in the horizontal direction", and a "filter horizontal array in which a transparent filter 23W, a transparent filter 23W, and R filter 23R and a G filter 23G are disposed in parallel in the horizontal direction" are sequentially arranged in the vertical direction. Further, in the second sub-array, a "filter horizontal array in which a G filter 23G, an R filter 23R, a transparent filter 23W and a transparent filter 23W are disposed in parallel in the horizontal direction", a "filter horizontal array in which a transparent filter 23W, a transparent filter 23W, a G filter 23G and a B filter 23B are disposed in parallel in the horizontal direction", a "filter horizontal array in which an R filter 23R, a G filter 23G, a transparent filter 23W and a transparent filter 23W are disposed in parallel in the horizontal direction" and a "filter horizontal array in which a transparent filter 23W, a transparent filter 23W, a B filter 23B and a G filter 23G are disposed in parallel in the horizontal direction" are sequentially arranged in the vertical direction.

Therefore, the positions of the R filters 23R in the first sub-array correspond to the positions of the B filters 23B in the second sub-array, and the positions of the B filters 23B in the first sub-array correspond to the positions of the R filters 23R in the second sub-array.

In the basic array pattern P7, the first sub-arrays (arrays A) and the second sub-arrays (arrays B) are disposed adjacent to each other in each direction of the horizontal direction and the vertical direction, so that the basic array pattern P7 corresponds to 8×8 pixels in the horizontal direction and in the vertical direction as a whole.

The color filter array 22 according to the present embodiment has the following characteristics.

[Characteristics (1)]

The color filter array 22 according to the present embodiment includes a basic array pattern P7 which is a square array pattern corresponding to 8×8 pixels (M×N pixels) in the horizontal direction and in the vertical direction, and this basic array pattern P7 is repeatedly disposed in the horizontal direction and in the vertical direction. Therefore, in the color filter array 22, R filters 23R, G filters 23G. B filters 23B and transparent filters 23W are periodically arranged. It is thus possible to perform processing according to the repeating pattern when performing demosaicing processing or the like, on R. G and B signals and it is possible to use a common processing circuit before and after thinning processing when reducing the size of an image by performing thinning processing in units of the basic array pattern P7.

[Characteristics (2)]

In the basic array pattern P7 according to the present embodiment, eight types of filter horizontal arrays extending in parallel in the horizontal direction are sequentially arranged in the vertical direction, which forms eight types of filter vertical arrays extending in parallel in the vertical direction.

In the basic array pattern P7, all the filter horizontal arrays and the filter vertical arrays respectively include four pixels of transparent filters 23W. Further, all the filter horizontal arrays and the filter vertical arrays respectively include two pixels of G filters 23G. Still further, all the filter horizontal arrays and the filter vertical arrays respectively include one pixel of an R filter 23R. Further, all the filter horizontal arrays and the filter vertical arrays respectively include one pixel of a B filter 23B. Therefore, each filter horizontal array and each filter vertical array in the basic array pattern P7 are respectively comprised of four pixels of transparent filters 23W, two pixels of G filters 23G, one pixel of an R filter 23R and one pixel of a B filter 23B.

In the color filter array 22 configured by disposing a plurality of the basic array patterns P7 in parallel, transparent filters 23W are disposed within each pixel line (filter line) of the horizontal direction (H), the vertical direction (V) and the diagonal directions (NE and NW). By this means, it is possible to perform sampling of brightness information in a high frequency range regardless of a direction of a high frequency in the input image and it is possible to obtain image data with excellent resolution by reducing occurrence of a false color (color moire).

[Characteristics (3)]

Further, in the basic array pattern P7 according to the present embodiment, because G filters 23G (second filter) corresponding to two pixels are disposed on each filter horizontal array and on each filter vertical array, it is possible to improve color reproduction precision of demosaicing processing in a high frequency range in the horizontal direction and in the vertical direction.

Particularly, in the basic array pattern P7 according to the present embodiment, an R filter 23R (third filter) and a B filter 23B (fourth filter) respectively corresponding to one pixel are disposed on each filter horizontal array and on each filter vertical array. Therefore, it is possible to improve color reproduction precision of demosaicing processing in a high frequency range in the horizontal direction and in the vertical direction not only for a color G corresponding to the G filters, but also a color R and a color B respectively corresponding to the R filters (pixels R) and the B filters (pixels B). Accordingly, it is possible to improve color reproduction precision in a high frequency range for all the colors of the three primary colors, so that it is possible to acquire data of a sharp image with extremely high resolution.

[Characteristics (4)]

The numbers of pixels of the pixels R, the pixels G, the pixels B and the pixels W corresponding to the RGBW filters 23R, 23G, 23B and 23W within the basic array pattern P7 are respectively eight pixels, sixteen pixels, eight pixels and thirty-two pixels, and thus the ratio of the numbers of pixels of the RGBW pixels is 1:2:1:4 (the number of pixels W≥the number of pixels G≥the number of pixels R; the number of pixels W≥the number of pixels G≥the number of pixels B). In this way, also in the color filter array 22 according to the present embodiment, the ratio of the numbers of pixels of the pixels W and the pixels G accounts for 48/64 (3/4) of the total, it is possible to suppress aliasing upon demosaicing processing and realize favorable high frequency reproducibility.

[Characteristics (5)]

Also in the color filter array 22 according to the present embodiment, among adjacent eight pixel lines extending in the NW direction and in the NE direction (diagonal pixel lines), transparent filters 23W are included in all the diagonal pixel lines, and G filters 23G are included in 6/8 of the diagonal pixel lines. Therefore, because RGB filters 23R, 23G and 23B are respectively disposed in close pixel lines extending in the diagonal directions (NE and NW), it is possible to effectively suppress color moire (false color) which may occur by the input image having high frequency components in the diagonal directions (NE and NW). Particularly, in this example, because transparent filters 23W are included in all the diagonal pixel lines, it is possible to obtain sharper image data.

[Characteristics (6)]

Also in the color filter array 22 according to the present embodiment, each of the pixels G is disposed at a pixel position adjacent to each of the R filters (pixels R) and the B filters (pixels B) on the left, right, upper or lower side (vertical direction/horizontal direction) or in the diagonal directions (adjacent positions in the vertical direction and in the diagonal direction in the present embodiment). By this means, pixels R and pixels B are uniformly disposed within the color filter array 22 (within the basic array pattern P7), so that it is possible to improve precision of demosaicing processing and realize favorable color reproducibility. Further, in the basic array pattern, the positions of the R filters 23R in the first sub-array correspond to the positions of the B filters 23B in the second sub-array, and the positions of the B filters 23B in the first sub-array correspond to the positions of the R filters 23R in the second sub-array, and the W filters 23W and the G filters 23G are disposed at the same positions in the first sub-array and the second sub-array. Therefore, it is possible to prevent demosaicing processing from becoming complicated even if the size of the basic array pattern becomes large.

[Characteristics (7)]

Further, also in the color filter array 22 of the present embodiment, G filters (pixels G) are disposed in two or more pixels among eight pixels adjacent around each of pixels (pixels W, pixels R and pixels B) other than the pixels G, so that pixels G are disposed in a uniformly scattered manner. Further, pixels G are disposed in one or more pixels (one pixel in the diagonal position in the present embodiment) among eight pixels adjacent around each of the pixels G. By this means, it is possible to improve color reproduction precision in demosaicing processing.

[Characteristics (8)]

Further, also in the color filter array 22 of the present embodiment, because pixels W are disposed adjacent to "pixels G which have a high contribution ratio to brightness", it is possible to improve color reproduction precision at positions of the pixels W in color interpolation processing (demosaicing processing) of the pixels W.

It should be noted that the color filter array 22 configured using the basic array pattern P7 shown in FIG. 9 can be also configured using other basic array patterns, and an array pattern corresponding to 8×8 pixels obtained by shifting the basic array pattern shown in FIG. 9 in the horizontal direction and/or in the vertical direction may be used as a basic array pattern.

As described above, because the color filter array 22 according to the present embodiment has the above-described characteristics, it is possible to simplify demosaicing processing in the subsequent stage, improve color reproduction precision of demosaicing processing in a high frequency range, suppress aliasing and improve high frequency reproducibility upon demosaicing processing and realize higher resolution and higher sensitivity. Particularly, because R filters 23R and B filters 23B are also disposed in each filter horizontal array and each filter vertical array, the color filter array 22 according to the present embodiment excels in high frequency reproducibility in the horizontal direction and in the vertical direction.

Eighth Embodiment

Figure 10:
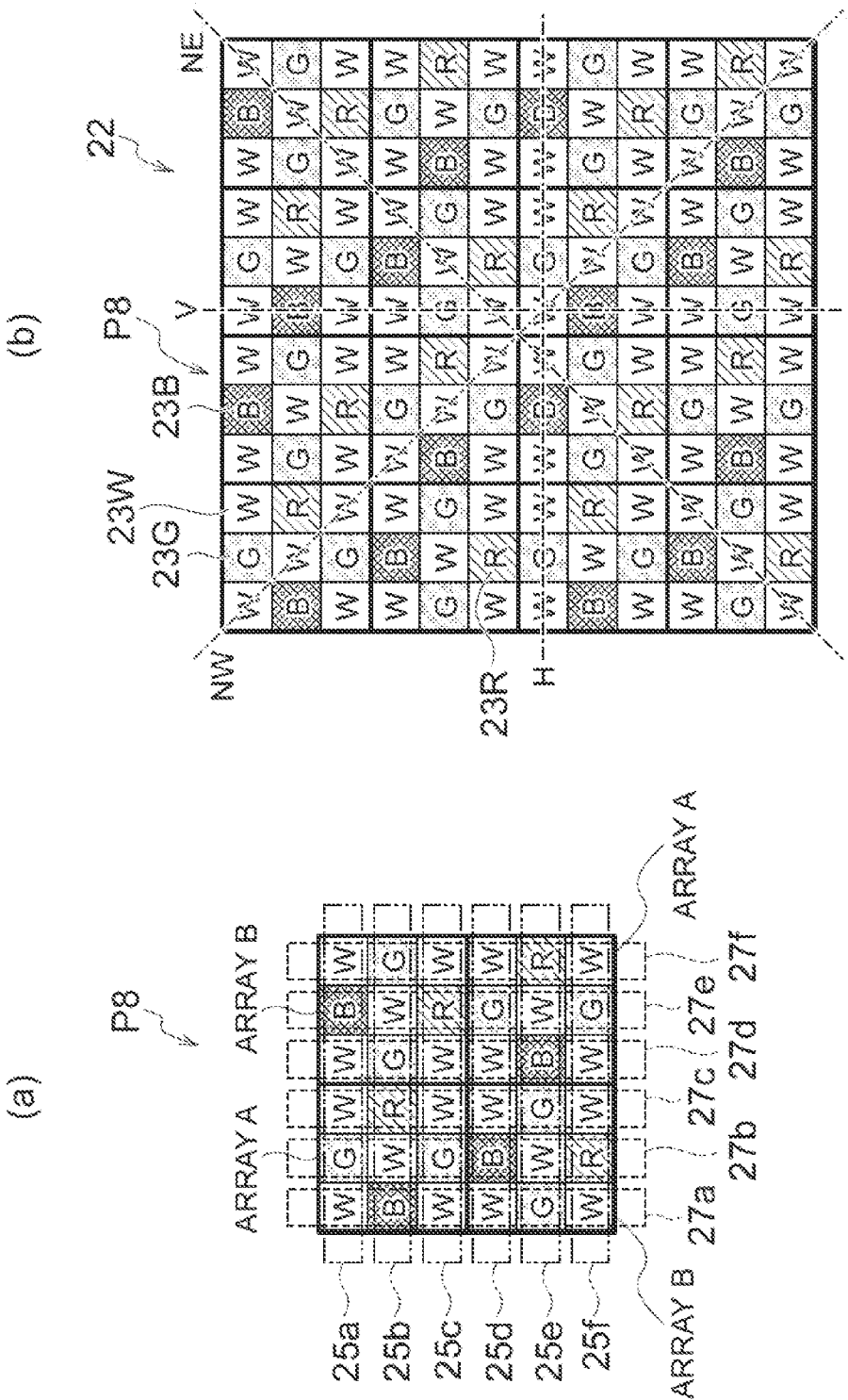
FIG. 10 is a diagram showing a basic array pattern of color filters according to an eighth embodiment, (a) portion shows one basic array pattern, and (b) portion shows a state where a total of four basic array patterns of (a) portion are disposed, two in the horizontal direction and two in the vertical direction.

FIG. 10 is a diagram showing a basic array pattern of color filters according to the eighth embodiment, (a) portion shows one basic array pattern P8, and (b) portion shows a state where a total of four basic array patterns P8 are disposed, two in the horizontal direction and two in the vertical direction.

In the present embodiment, the explanation of the features which are the same as or similar to those in the above-described embodiments will be omitted.

In the color filter array according to the present embodiment, a basic array pattern P8 is configured to include two types of sub-arrays (two first sub-arrays (arrays A) and two second sub-arrays (arrays B)).

The first sub-array (array A) corresponds to 3×3 pixels ((M/2)×(M/2) pixels) in the horizontal direction and in the vertical direction, and transparent filters 23W are disposed in pixels at the four corners and in a pixel at the center. Further, G filters 23G are disposed at respective pixel positions on the upper and the lower side (vertical direction) adjacent to the transparent filter 23W at the center, a B filter 23B is disposed at one side (left position in FIG. 10) of the pixel positions on the left and right side (horizontal direction) adjacent to the transparent filter 23W at the center, and an R filter 23R is disposed at the other side (right position in FIG. 10).

Further, the second sub-array (array B) corresponds to 3×3 pixels in the horizontal direction and in the vertical direction, and transparent filters 23W are disposed in pixels at the four corners and in a pixel at the center. Further, G filters 23G are disposed at respective pixel positions on the left and right side (horizontal direction) adjacent to the transparent filter 23W at the center, a B filter 23B is disposed at one side (upper position in FIG. 10) of the pixel positions on the upper and lower side (vertical direction) adjacent to the transparent filter 23W at the center, and an R filter 23R is disposed at the other side (lower position in FIG. 10).

The first sub-arrays and the second sub-arrays are disposed adjacent to each other in each direction of the horizontal direction and the vertical direction, and the basic array pattern P8 corresponds to 6×6 pixels in the horizontal direction and in the vertical direction as a whole.

Therefore, in the color filter array including a plurality of the basic array patterns P8, transparent filters 23W are disposed on each pixel line extending in the horizontal direction and on each pixel line extending in the vertical direction. Further, transparent filters 23W are also disposed on each pixel line comprised of three or more pixels extending in each of diagonal directions forming 45° with the horizontal direction and the vertical direction. Still further, G filters 23G corresponding to two pixels and an R filter 23R and a B filter 23B respectively corresponding to one pixel are disposed in each of the first sub-array and the second sub-array.

Further, the positions of the G filters 23G in the first sub-array correspond to the positions of the B filter 23B and the R filter 23R in the second sub-array, and the positions of the R filter 23R and the B filter 23B in the first sub-array correspond to the positions of the G filters 23G in the second sub-array.

The color filter array 22 according to the present embodiment has the following characteristics.

[Characteristics (1)]

The color filter array 22 according to the present embodiment includes a basic array pattern P8 which is a square array pattern corresponding to 6×6 pixels (M×N pixels) in the horizontal direction and in the vertical direction, and the basic array pattern P8 is repeatedly disposed in the horizontal direction and in the vertical direction. Therefore, in the color filter array 22, R filters 23R, G filters 23G, B filters 23B and transparent filters 23W are periodically arranged. It is thus possible to perform processing according to the repeating pattern when performing demosaicing processing or the like, on R, G and B signals, and it is possible to use a common processing circuit before and after thinning processing when reducing the size of an image by performing thinning processing in units of the basic array pattern P8.

[Characteristics (2)]

In the basic array pattern P8 according to the present embodiment, six types of filter horizontal arrays extending in parallel in the horizontal direction are sequentially arranged in the vertical direction, which forms six types of filter vertical arrays extending in parallel in the vertical direction.

In the basic array pattern P8, all the filter horizontal arrays and the filter vertical arrays respectively include one or more pixels of transparent filters 23W, such that a first filter horizontal array 25a, a third filter horizontal array 25c, a fourth filter horizontal array 25d, a sixth filter horizontal array 25f, a first filter vertical array 27a, a third filter vertical array 27c, a fourth filter vertical array 27d and a sixth filter vertical array 27f respectively include four pixels of transparent filters 23W, and a second filter horizontal array 25b, a fifth filter horizontal array 25e, a second filter vertical array 27b and a fifth filter vertical array 27e respectively include two pixels of transparent filters 23W.

In the color filter array 22 configured by disposing a plurality of the basic array patterns P8 in parallel, transparent filters 23W are disposed within each pixel line of the horizontal direction (H), the vertical direction (V) and the diagonal directions (NE and NW), each pixel line being comprised of three or more pixels. By this means, it is possible to perform sampling of brightness information in a high frequency range regardless of a direction of a high frequency in the input image, and it is possible to obtain image data with excellent resolution by reducing occurrence of a false color (color moire).

[Characteristics (3)]

Further, in the basic array pattern P8 according to the present embodiment, because G filters 23G corresponding to one pixel or two pixels are disposed on each filter horizontal array and on each filter vertical array, it is possible to improve color reproduction precision of demosaicing processing in a high frequency range in the horizontal direction and in the vertical direction.

[Characteristics (4)]

The numbers of pixels of the pixels R, the pixels G, the pixels B and the pixels W corresponding to the RGBW filters 23R, 23G, 23B and 23W within the basic array pattern P8 are respectively four pixels, eight pixels, four pixels and twenty pixels, and thus the ratio of the numbers of pixels of the RGBW pixels is 1:2:1:5 (the number of pixels W≥the number of pixels G≥the number of pixels R the number of pixels W≥the number of pixels G≥the number of pixels B). In this way, also in the color filter array 22 according to the present embodiment, the ratio of the numbers of pixels of the pixels W and the pixels G accounts for 28/36 (7/9) of the total, it is possible to suppress aliasing upon demosaicing processing and realize favorable high frequency reproducibility.

[Characteristics (5)]

Also in the color filter array 22 according to the present embodiment, among adjacent six pixel lines extending in the NW direction and in the NE direction (diagonal pixel lines), transparent filters 23W are included in all the diagonal pixel lines, and G filters 23G are included in 4/6 of the diagonal pixel lines. Further, at a position adjacent to at least one side of each diagonal pixel line including R filters 23R and B filters 23B, another diagonal pixel line including R filters 23R and B filters 23B of the same color is disposed. Therefore, because RGB filters 23R, 23G and 23B are respectively disposed in close pixel lines extending in the diagonal directions (NE and NW), it is possible to effectively suppress color moire (false color) which may occur by the input image having high frequency components in the diagonal directions (NE and NW). Particularly, in this example, because transparent filters 23W are included in all the diagonal pixel lines, it is possible to obtain sharper image data.

[Characteristics (6)]

Also in the color filter array 22 according to the present embodiment, each of the pixels G is disposed at a pixel position adjacent to each of the R filters (pixels R) and the B filters (pixels B) on the left, right, upper or lower side (vertical direction/horizontal direction) or in the diagonal directions. By this means, pixels R and pixels B are uniformly disposed within the color filter array 22 (within the basic array pattern P8), so that it is possible to improve precision of demosaicing processing and realize favorable color reproducibility. Further, in the basic array pattern, because the first sub-array and the second sub-array are rotationally symmetric, it is possible to prevent demosaicing processing from becoming complicated even if the size of the basic array pattern becomes large.

[Characteristics (7)]

Further, also in the color filter array 22 of the present embodiment, G filters (pixels G) are disposed in two or more pixels among eight pixels adjacent around each of pixels (pixels W, pixels R and pixels B) other than the pixels G, so that pixels G are disposed in a uniformly scattered manner. By this means, it is possible to improve color reproduction precision in demosaicing processing.

[Characteristics (8)]

Further, also in the color filter array 22 of the present embodiment, because pixels W are disposed adjacent to "pixels G which have a high contribution ratio to brightness", it is possible to improve color reproduction precision at positions of the pixels W in color interpolation processing (demosaicing processing) of the pixels W.

It should be noted that the color filter array 22 configured using the basic array pattern P8 shown in (a) portion of FIG. 10 can be also configured using other basic array patterns, and an array pattern corresponding to 6×6 pixels obtained by shifting the basic array pattern shown in (a) portion of FIG. 10 in the horizontal direction and/or in the vertical direction may be used as a basic array pattern.

As described above, because the color filter array 22 according to the present embodiment has the above-described characteristics, it is possible to simplify demosaicing processing in the subsequent stage, improve color reproduction precision of demosaicing processing in a high frequency range, suppress aliasing and improve high frequency reproducibility upon demosaicing processing and realize higher resolution and higher sensitivity.

Ninth Embodiment

FIG. 11 is a diagram showing a basic array pattern of color filters according to the ninth embodiment, (a) portion shows one basic array pattern P9, and (b) portion shows a state where a total of four basic array patterns P9 are disposed, two in the horizontal direction and two in the vertical direction.

In the present embodiment, the explanation of the features which are the same as or similar to those in the above-described embodiments will be omitted.

[Characteristics (1)]

The color filter array 22 according to the present embodiment includes a basic array pattern P9 which is a square array pattern corresponding to 6×6 pixels (M×N pixels) in the horizontal direction and in the vertical direction, and the basic array pattern P9 is repeatedly disposed in the horizontal direction and in the vertical direction. This basic array pattern P9 includes a first sub-array (array A), a second sub-array (array B), a third sub-array (array C) and a fourth sub-array (array D), which are four types of sub-arrays, in each of the sub-arrays, color filters being arranged in an array pattern corresponding to 3×3 pixels ((M/2)×(N/2) pixels).

In the first sub-array (array A), a "filter horizontal array in which a transparent filter 23W, an R filter 23R and a transparent filter 23W are disposed in parallel in the horizontal direction", a "filter horizontal array in which a B filter 23B, a transparent filter 23W and a G filter 23G are disposed in parallel in the horizontal direction" and a "filter horizontal array in which a transparent filter 23W, a G filter 23G and a transparent filter 23W are disposed in parallel in the horizontal direction" are sequentially arranged in the vertical direction. In the second sub-array (array B), a "filter horizontal array in which a transparent filter 23W, a G filter 23G and a transparent filter 23W are disposed in parallel in the horizontal direction", a "filter horizontal array in which an R filter 23R, a transparent filter 23W and a G filter 23G are disposed in parallel in the horizontal direction" and a "filter horizontal array in which a transparent filter 23W, a B filter 23B and a transparent filter 23W are disposed in parallel in the horizontal array" are sequentially arranged in the vertical direction. In the third sub-array (array C), a "filter horizontal array in which a transparent filter 23W, a B filter 23B and a transparent filter 23W are disposed in parallel in the horizontal direction", a "filter horizontal array in which a G filter 23G, a transparent filter 23W and an R filter 23R are disposed in parallel in the horizontal direction" and a "filter horizontal array in which a transparent filter 23W, a G filter 23G and a transparent filter 23W are disposed in parallel in the horizontal direction" are sequentially arranged in the vertical direction. In the fourth sub-array (array D), a "filter horizontal array in which a transparent filter 23W, a G filter 23G and a transparent filter 23W are disposed in parallel in the horizontal direction", a "filter horizontal array in which a G filter 23G, a transparent filter 23W and a B filter 23B are disposed in parallel in the horizontal direction" and a "filter horizontal array in which a transparent filter 23W, an R filter 23R and a transparent filter 23W are disposed in parallel in the horizontal direction" are sequentially arranged in the vertical direction.

Among these sub-arrays, the first sub-array (array A) and the fourth sub-array (array D) are disposed in one of the diagonal directions, and the second sub-array (array B) and the third sub-array (array C) are disposed in the other of the diagonal directions.

Therefore, in the color filter array 22. R filters 23R, G filters 23G, B filters 23B and transparent filters 23W are periodically arranged. It is thus possible to perform processing according to the repeating pattern when performing demosaicing processing or the like, on R, G and B signals, and it is possible to use a common processing circuit before and after thinning processing when reducing the size of an image by performing thinning processing in units of the basic array pattern P9.

[Characteristics (2)]

In the basic array pattern P9 according to the present embodiment, six types of filter horizontal arrays extending in parallel in the horizontal direction are sequentially arranged in the vertical direction, which forms six types of filter vertical arrays extending in parallel in the vertical direction.

In the basic array pattern P9, all the filter horizontal arrays and the filter vertical arrays respectively include one or more pixels of transparent filters 23W, such that a first filter horizontal array 25a, a third filter horizontal array 25c, a fourth filter horizontal array 25d, a sixth filter horizontal array 25f, a first filter vertical array 27a, a third filter vertical array 27c, a fourth filter vertical array 27d and a sixth filter vertical array 27f respectively include four pixels of transparent filters 23W, and a second filter horizontal array 25b, a fifth filter horizontal array 25e, a second filter vertical array 27b and a fifth filter vertical array 27e respectively include two pixels of transparent filters 23W.

In the color filter array 22 configured by disposing a plurality of the basic array patterns P9 in parallel, transparent filters 23W are disposed within each pixel line of the horizontal direction (H), the vertical direction (V) and the diagonal directions (NE and NW), each pixel line being comprised of three or more pixels. By this means, it is possible to perform sampling of brightness information in a high frequency range regardless of a direction of a high frequency in the input image, and it is possible to obtain image data with excellent resolution by reducing occurrence of a false color (color moire).

[Characteristics (3)]

Further, in the basic array pattern P9 according to the present embodiment, because G filters 23G corresponding to one pixel or two pixels are disposed on each filter horizontal array and on each filter vertical array, it is possible to improve color reproduction precision of demosaicing processing in a high frequency range in the horizontal direction and in the vertical direction.

[Characteristics (4)]

The numbers of pixels of the pixels R, the pixels G, the pixels B and the pixels W corresponding to the RGBW filters 23R, 23G, 23B and 23W within the basic array pattern P9 are respectively four pixels, eight pixels, four pixels and twenty pixels, and thus the ratio of the numbers of pixels of the RGBW pixels is 1:2:1:5 (the number of pixels W≥the number of pixels G≥the number of pixels R the number of pixels W≥the number of pixels G≥the number of pixels B). In this way, also in the color filter array 22 according to the present embodiment, the ratio of the numbers of pixels of the pixels W and the pixels G accounts for 28/36 (7/9) of the total, it is possible to suppress aliasing upon demosaicing processing and realize favorable high frequency reproducibility.

[Characteristics (5)]

Also in the color filter array 22 according to the present embodiment, among adjacent six pixel lines extending in the NW direction and in the NE direction (diagonal pixel lines), transparent filters 23W are included in all the diagonal pixel lines, and G filters 23G are included in 4/6 of the diagonal pixel lines. Further, at a position adjacent to at least one side of each diagonal pixel line including R filters 23R and B filters 23B, another diagonal pixel line including R filters 23R and B filters 23B of the same color is disposed. Therefore, because RGB filters 23R, 23G and 23B are respectively disposed in close pixel lines extending in the diagonal directions (NE and NW), it is possible to effectively suppress color moire (false color) which may occur by the input image having high frequency components in the diagonal directions (NE and NW). Particularly, in this example, because transparent filters 23W are included in all the diagonal pixel lines, it is possible to obtain sharper image data.

[Characteristics (6)]

Also in the color filter array 22 according to the present embodiment, each of the pixels G is disposed at a pixel position adjacent to each of the R filters (pixels R) and the B filters (pixels B) on the left, right, upper or lower side (vertical direction/horizontal direction) or in the diagonal directions. By this means, pixels R and pixels B are uniformly disposed within the color filter array 22 (within the basic array pattern P9), so that it is possible to improve precision of demosaicing processing and realize favorable color reproducibility. Further, in the basic array pattern, because from the first sub-array to the fourth sub-array are rotationally symmetric respectively, it is possible to prevent demosaicing processing from becoming complicated even if the size of the basic array pattern becomes large.

[Characteristics (7)]

Further, also in the color filter array 22 of the present embodiment, G filters (pixels G) are disposed in two or more pixels among eight pixels adjacent around each of pixels (pixels W, pixels R and pixels B) other than the pixels G, so that pixels G are disposed in a uniformly scattered manner. Further, pixels G are disposed in one or more pixels (one pixel in the diagonal position in the present embodiment) among eight pixels adjacent around each of the pixels G. Particularly, in the present embodiment, two or more pixels of pixels G exist within a range of 3×3 pixels (including pixels G). By this means, it is possible to improve color reproduction precision in demosaicing processing.

[Characteristics (8)]

Further, also in the color filter array 22 of the present embodiment, because pixels W are disposed on the left, right, upper or lower side (vertical direction/horizontal direction) or in the diagonal directions adjacent to "pixels G which have a high contribution ratio to brightness", it is possible to improve color reproduction precision at positions of the pixels W in color interpolation processing (demosaicing processing) of the pixels W.

It should be noted that the color filter array 22 configured using the basic array pattern P9 shown in (a) portion of FIG. 11 can be also configured using other basic array patterns, and an array pattern corresponding to 6×6 pixels obtained by shifting the basic array pattern shown in (a) portion of FIG. 11 in the horizontal direction and/or in the vertical direction may be used as a basic array pattern.

As described above, because the color filter array 22 according to the present embodiment has the above-described characteristics, it is possible to simplify demosaicing processing in the subsequent stage, improve color reproduction precision of demosaicing processing in a high frequency range, suppress aliasing and improve high frequency reproducibility upon demosaicing processing and realize higher resolution and higher sensitivity.

Modified Example

While an example of "first filter: transparent filter", "first visible light wavelength region: wavelength region of green, second filter: G filter", "second visible light wavelength region: wavelength region of red, third filter: R filter" and "third visible light wavelength region: wavelength region of blue, fourth filter: B filter" has been described in the above-described respective embodiments, colors that can be used for the color filters are not limited to these colors, and it is also possible to use color filters corresponding to colors that satisfy the following conditions.

<Conditions for Second Filter>

While examples have been provided for explanation in the above-described respective embodiments where a G filter 23G of color G is used as the second filter of the present invention, it is also possible to use a filter which satisfies any of the following conditions in place of the G filter 23G or in place of part of the G filter 23G.

[Condition (1)]

It is possible to use as a second filter in place of a G filter 23G, a color filter corresponding to a color having a higher contribution ratio to obtain a brightness signal than those of colors corresponding to other color filters (a color corresponding to a second visible light wavelength region and a color corresponding to a third visible light wavelength region) except a transparent (white) filter (W filter). For example, among filter colors except a transparent filter (W filter), a color filter whose contribution ratio to obtain a brightness signal is 50% or higher can be used as the second filter, and as indicated in equation (1) in the above-described embodiment, because the contribution ratio of a color G (green) accounts for 59% of colors (RGB) except W (transparence), a G filter is used as the second filter. It should be noted that the contribution ratios of color other than the color G can be acquired through experiments and simulations.

[Condition (2)]

Condition (2) is that the first filter should have a peak of the transmittance which falls within a range of a wavelength between 480 nm and 570 nm. As the transmittance of the filter, for example, a value measured at a spectrophotometer is used. This wavelength range is a range defined for distinguishing among the first visible light wavelength region, the second visible light wavelength region and the third visible light wavelength region of the present invention, and defined so that the range does not include peaks of the aforementioned color R, the color B or the like whose contribution ratio is relatively low and includes a peak of the color G or the like whose contribution ratio is relatively high. Therefore, the filter whose peak of transmittance falls within a range of a wavelength between 480 nm and 570 nm can be used as the second filter. It should be noted that the filter whose peak of transmittance falls outside the range of the wavelength between 480 nm and 570 nm is used as the third filter and the fourth filter (R filter 23R, B filter 23B and the like) of the present invention.

[Condition (3)]

Condition (3) is that the first filter should have transmittance higher than that of the third filter and the fourth filter (an R filter 23R and a B filter 23B) within a range of a wavelength between 500 n and 560 nm. Also in this condition (3), for example, a value measured at a spectrophotometer is used as the transmittance of the filter. The wavelength range of the condition (3) is also a range defined for distinguishing among the first visible light wavelength region, and the second visible light wavelength region and the third visible light wavelength region of the present invention, and a range in which the transmittance of a filter having color whose aforementioned contribution ratio is relatively higher than those of the color R, color B, or the like, is higher than the transmittance of the RB filters 23R and 23B, or the like. It is therefore possible to use a filter whose transmittance is relatively high within the range of the wavelength between 500 nm and 560 nm as the second filter and use a filter whose transmittance is relatively low as the third filter and the fourth filter.

[Condition (4)]

Condition (4) is that a filter having two or more colors including a color which contributes most to a brightness signal among three primary colors (for example, a color G among RGB) and a color different from the three primary colors should be used as the second filter. In this case, a filter corresponding to colors other than the color of the second filter is used as the third filter and the fourth filter.

It should be noted that the first visible light wavelength region, the second visible light wavelength region and the third visible light wavelength region correspond to the three primary colors (for example, RGB), and the color filters, in addition to the color filter corresponding to the three primary colors, may further include a color filter having higher transmittance to a visible light wavelength region corresponding to a color different from the three primary colors than to other visible light wavelength regions. Further, because each of the first visible light wavelength region, the second visible light wavelength region and the third visible light wavelength region includes a plurality of wavelength regions, color filters may be configured so that a plurality of colors corresponding to these plurality of wavelength regions correspond to the first visible light wavelength region, the second visible light wavelength region and the third visible light wavelength region.

<A Plurality of Types of G Filters>

Therefore, a G filter 23G of the color G as the second filter is not limited to one type, and, for example, a plurality of types of G filters 23G can be also used as the second filter. That is, the G filter 23G of the color filters (basic array pattern) according to the above-described respective embodiments may be replaced with the first G filter 23G1 or the second G filter 23G2 as appropriate. The first G filter 23G1 transmits light G of a first wavelength band, and the second G filter 23G2 transmits light G of a second wavelength band which has high correlation with the first G filter 23G1 (see FIG. 12).

As the first G filter 23G1, an existing G filter (for example, the G filter 23G in the first embodiment) can be used. Further, as the second G filter 23G2, a filter having high correlation with the first G filter 23G1 can be used. In this case, it is desirable that a peak value of the spectral sensitivity curve of a light receiving element in which the second G filter 23G2 is disposed falls within a range of a wavelength, for example, between 500 nm and 535 nm (near a peak value of the spectral sensitivity curve of a light receiving element in which the existing G filter is disposed). It should be noted that as a method for determining color filters of four colors (R, G1, G2 and B), for example, the method disclosed in Japanese Patent Application Laid-Open No. 2003-284084 is used.

In this way, by using four types of colors to acquire an image using the color imaging element so as to increase acquired color information, it is possible to depict colors more accurately compared to a case where only three types of colors (RGB) are acquired. That is, it is possible to reproduce different colors which can be distinguished by eyes as different colors and to reproduce the same colors which are seen as the same colors (improve "distinction of colors").

Figure 13:
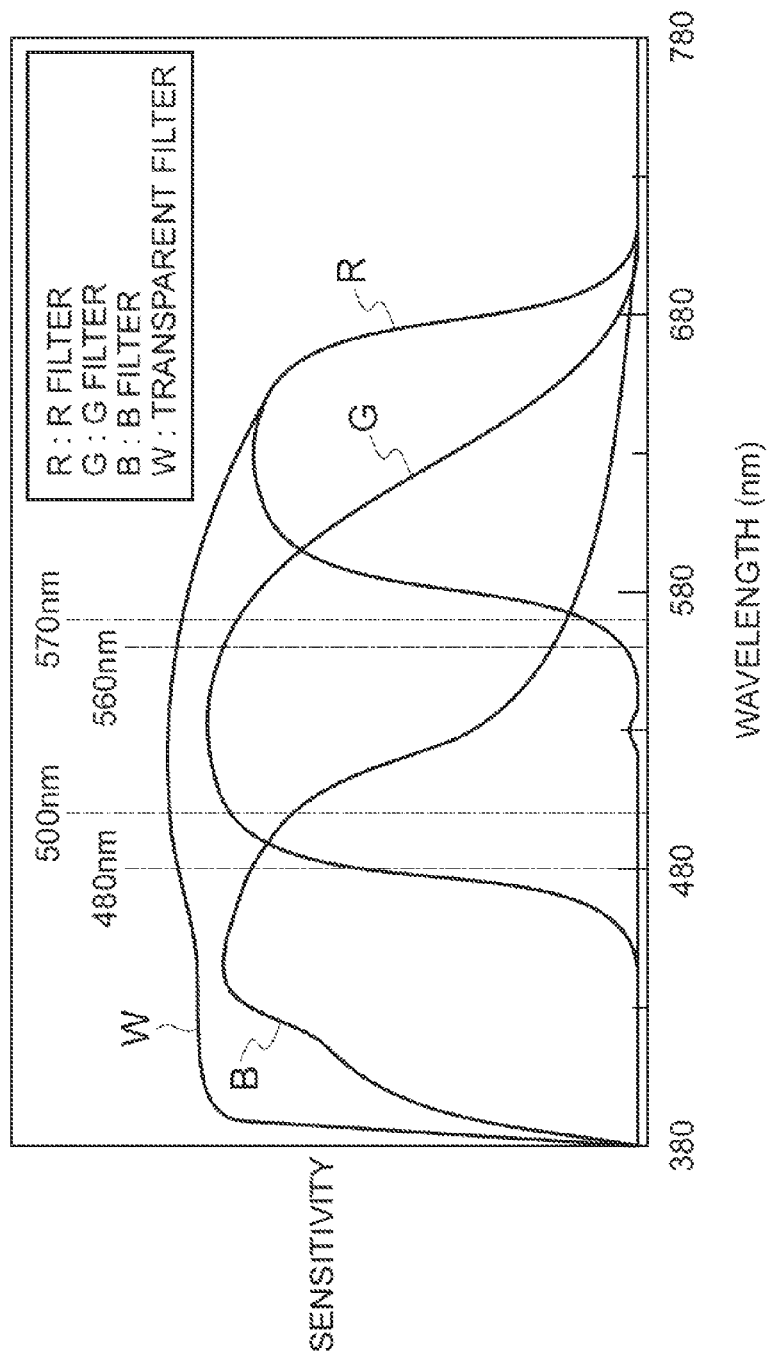
FIG. 13 is a graph showing spectral sensitivity characteristics of light receiving elements in which an R filter, a G filter, a B filter and a W filter (transparent filter) are disposed.

Further, in FIG. 13 which shows spectral sensitivity characteristics of the color filter array (light receiving element), peaks of the transmittance of the G filters 23G1 and 23G2 (peaks of sensitivity of the respective pixels G) fall within a range of a wavelength between 480 nm and 570 nm. The transmittance of the G filters 23G1 and 23G2 is higher than the transmittance of the RB filters 23R and 23B within a range of a wavelength between 500 nm and 560 nm. Therefore, the G filters 23G1 and 23G2 also satisfy the aforementioned conditions (2) and (3).

It is also possible to change disposition and the number of the G filters 23G1 and 23G2 as appropriate. Further, it is also possible to increase the types of G filters 23G to three or more.

<Transparent Filter (W Filter)>

A transparent filter 23W is a filter of a transparent color, and is sometimes referred to as a white filter or the like. The transparent filter 23W is a filter which can transmit a light corresponding to a wavelength region of a visible light and whose transmittance of for example, a light of each color of RGB (lights in the first visible light wavelength region, the second visible light wavelength region and the third visible light wavelength region) is 50% or higher. Typically, the transparent filter often indicates a filter having high transmittance in each wavelength band of RGB and practically having color characteristics close to transparence.

In FIG. 13 which shows spectral sensitivity characteristics of the color filter array (light receiving element), a peak of the transmittance of the transparent filter 23W (peak of sensitivity of white pixels) falls within a range of a wavelength between 480 nm and 570 nm. Further, the transmittance of the transparent filter 23W is higher than the transmittance of the RB filters 23R and 23B within a range of a wavelength between 500 nm and 560 nm.

<Emerald Filter (E filter)>

While in the above-described embodiments, a color filter comprised of color filters mainly corresponding to RGBW colors has been described, part of these color filters (RGB filters) may be replaced with filters of other colors, and, for example, an emerald filter E (fifth filter, emerald pixel) may be used. Particularly, it is preferable that the emerald filter is disposed in place of part of the second filter (G filter 23G). By using the color filter array of four colors in which part of the G filters 23G is replaced with the emerald filters in this way, it is possible to improve reproducibility of a high frequency component of brightness, reduce jagginess and improve resolution feeling.

Figure 14:
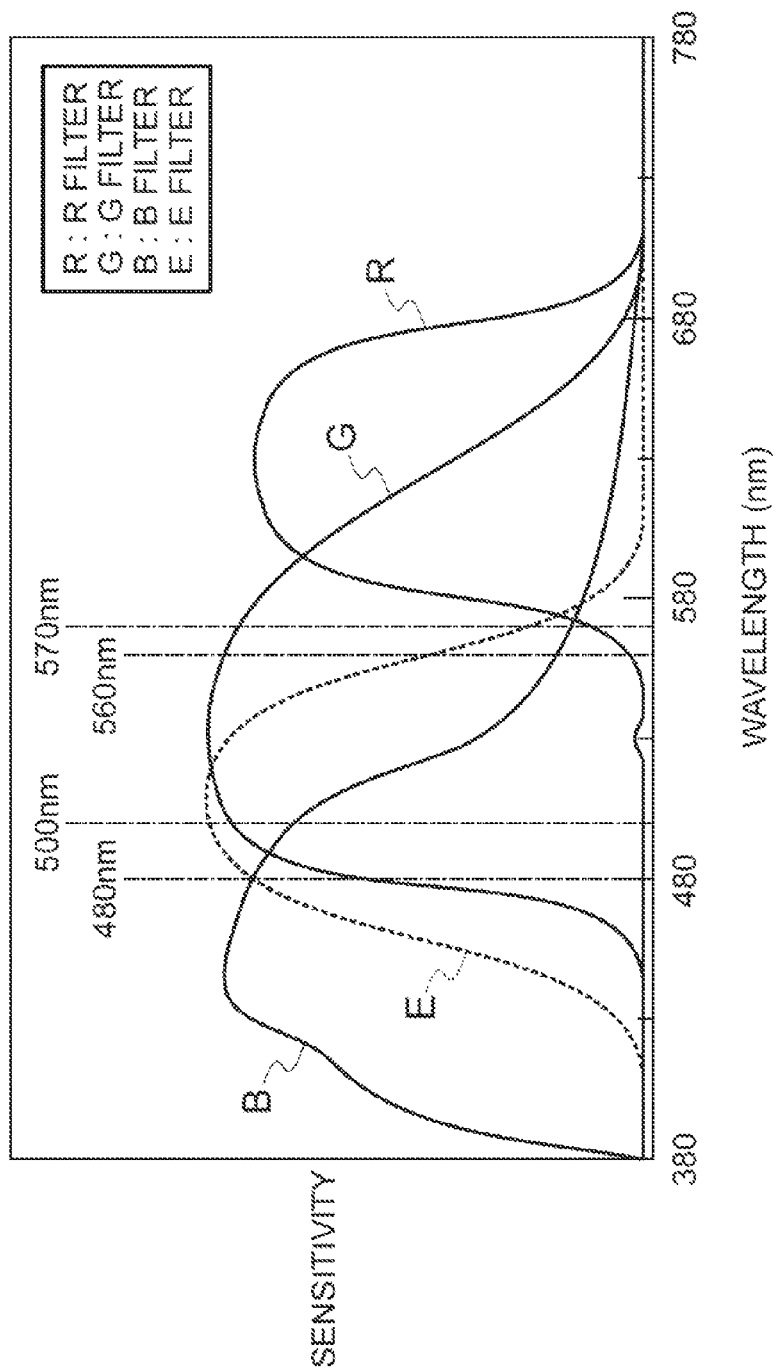
FIG. 14 is a graph showing spectral sensitivity characteristics of light receiving elements in which an R filter, a G filter, a B filter and an E filter (emerald filter) are disposed.

In FIG. 14 which shows spectral sensitivity characteristics of the color filter array (light receiving element), a peak of the transmittance of the emerald filter E (peak of sensitivity of the pixel E) falls within a range of a wavelength between 480 nm and 570 nm. Further, the transmittance of the emerald filter E is higher than the transmittance of the RB filters 23R and 23B within a range of a wavelength between 500 am and 560 nm. Therefore, the emerald filter E satisfies the aforementioned conditions (2) and (3).

It should be noted that while, in the spectral characteristics shown in FIG. 14, the emerald filter E has a peak at a shorter wavelength side than the G filter 23G, there is a case where the emerald filter E has a peak at a longer wavelength side than the G filter 23G (appears in a color slightly closer to yellow). As described above, it is possible to select a filter which satisfies each condition of the present invention as the emerald filter E, and, for example, it is possible to select an emerald filter E which satisfies the condition (1).

<Types of Other Colors=

While, in the above-described respective embodiments, the color filter array comprised of color filters of primary colors RGB has been described, the present invention can be applied to a color filter array comprised of, for example, color filters of four colors including a complementary color system of C (cyan), M (magenta) and Y (yellow) which are complementary colors of the primary colors RGB, and G and a transparent filter 23W. Also in this case, a color filter which satisfies any of the above-described conditions (1) to (4) is used as the second filter of the present invention, and the other color filters are used as the third filter, the fourth filter and the fifth filter.

<Honeycomb Arrangement>

While each color filter array of the above-described each embodiment includes a basic array pattern in which color filters of each color are arranged in two dimensions in the horizontal direction (H) and in the vertical direction (V), and this basic array pattern is repeatedly disposed in the horizontal direction (H) and in the vertical direction (V), the present invention is not limited to this.

For example, it is also possible to configure color filters using an array pattern in which a basic array pattern in a so-called honeycomb array obtained by rotating the basic array pattern of the above-described each embodiment by 45° around an optical axis is repeatedly disposed in the diagonal directions (NE and NW). In this case, the diagonal directions (NE and NW) correspond to the first and the second directions of the present invention, and the horizontal and vertical directions correspond to the third and the fourth directions of the present invention.

Figure 15:
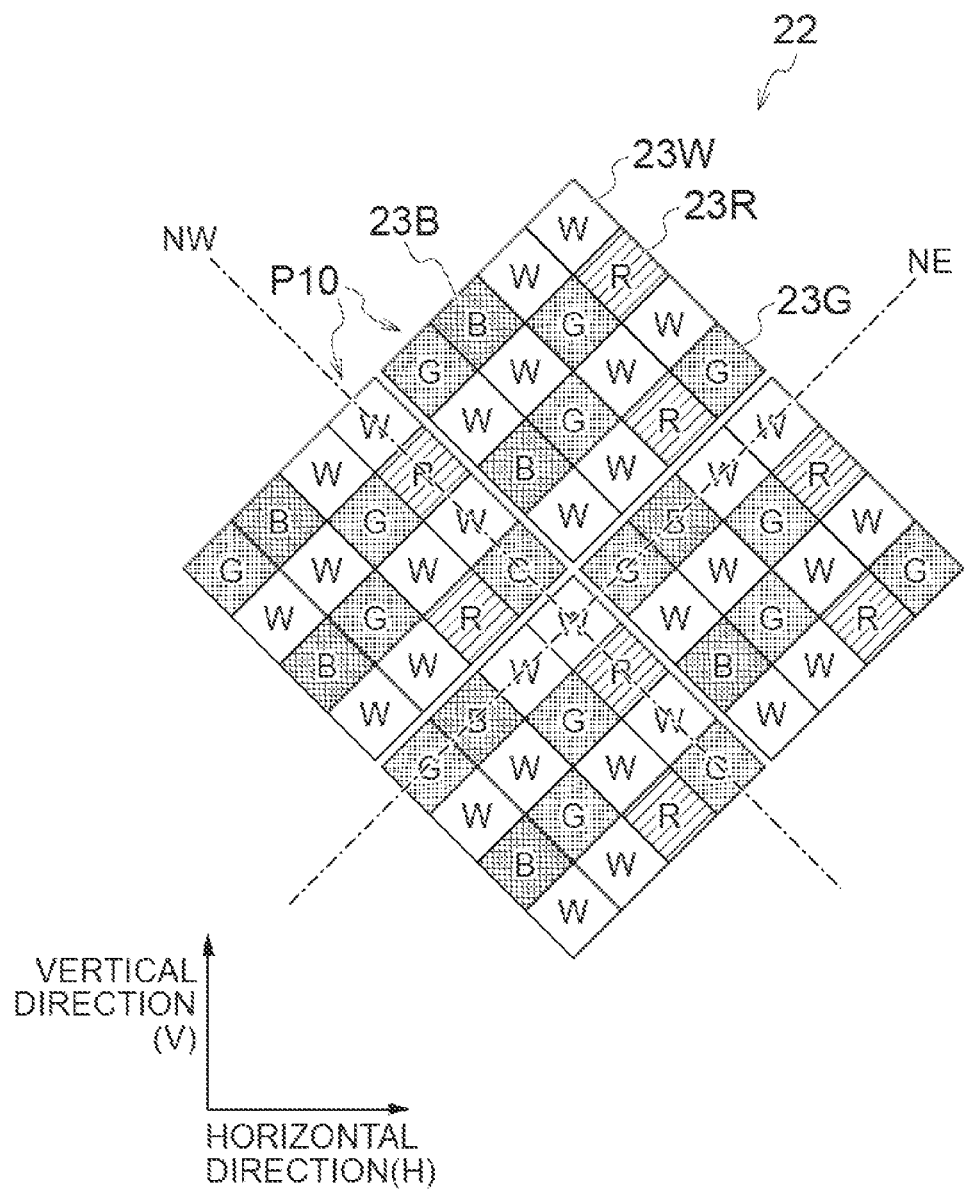
FIG. 15 is a front view showing one example of a color filter array in honeycomb arrangement.
Figure 16:
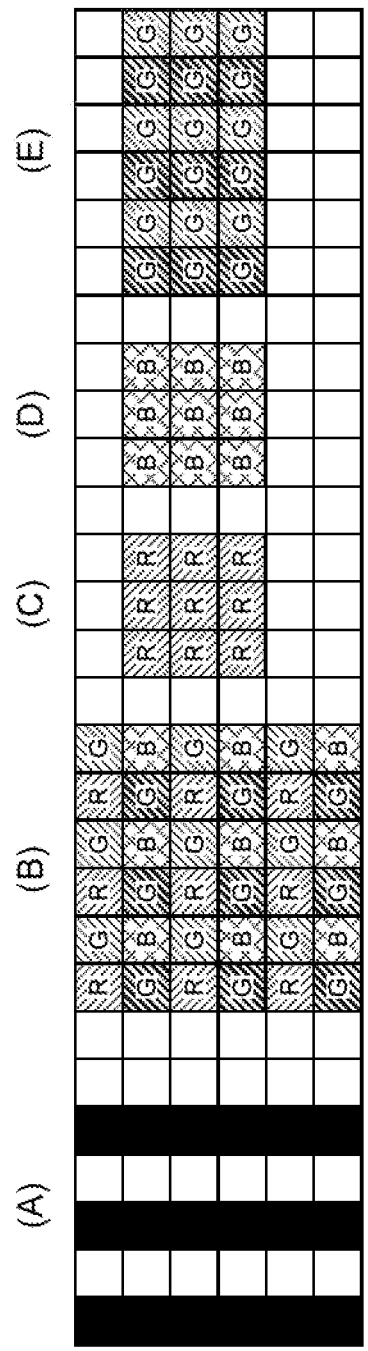
FIG. 16 is a diagram used for explaining a problem of a color imaging element having color filters of the conventional Bayer array.
Figure 17:
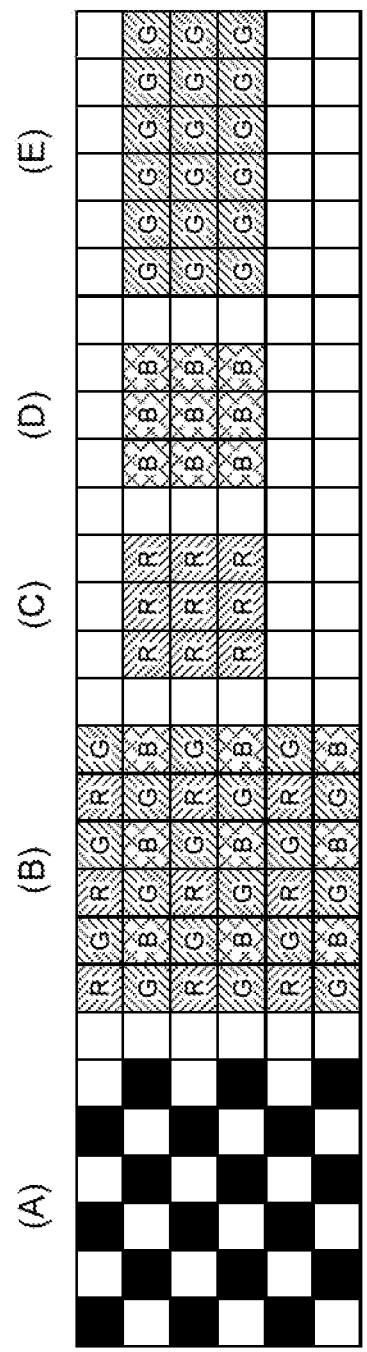
FIG. 17 is another diagram used for explaining a problem of a color imaging element having color filters of the conventional Bayer array.

FIG. 15 shows a color filter array using an array in which the basic array pattern P1 according to the above-described first embodiment is arranged in a honeycomb shape as a basic array pattern P10.

<The Number of Pixels Configuring Basic Array Pattern>

While, in the above-described embodiments, the basic array pattern corresponding to 4×4 pixels, the basic array pattern corresponding to 6×6 pixels and the basic array pattern corresponding to 8×8 pixels have been described, the number of corresponding pixels of the basic array pattern is not limited to these.

That is, in the color filter array, the number of corresponding pixels of the basic array pattern is not particularly limited if "the first filter (such as a W filter) corresponding to at least one pixel is disposed on each pixel line extending in the first direction, on each pixel line extending in the second direction, and on each pixel line extending in each of the third direction and the fourth direction which are tilted with respect to the first direction and the second direction", "the second filter (such as a G filter) corresponding to at least one pixel is disposed on each pixel line extending in the first direction and on each pixel line extending in the second direction, and each of the third filter and the fourth filter (such as an R filter and a B filter) is adjacent to the second filter" and "the first filter, the second filter, the third filter and the fourth filter are disposed respectively at least one pixel in the basic array pattern or the sub-array".

It should be noted that while the basic array pattern may be arranged in an array pattern corresponding to the other numbers of pixels, increase in the number of pixels of the basic array pattern makes signal processing such as de-mosaic processing complicated, while increase in the size of the basic array pattern provides no special advantages. Therefore, in order to prevent signal processing from becoming complicated, the size of the basic array pattern is preferably not too large, 10×10 pixels or smaller, and the basic array pattern corresponding to 6×6 pixels or 4×4 pixels is more preferable in terms of simplification of signal processing.

It goes without saying that the color filter array of the color imaging element of the present invention is not limited to the above-described embodiments, and various modification can be made without departing from the scope of the present invention. For example, the arrays of the color filters in the above-described embodiments and the modified example may be combined as appropriate.

Further, while a color imaging element mounted on a digital camera has been described in the above-described respective embodiments, the present invention can be applied to color imaging elements mounted on various electronic equipment (imaging devices) having imaging functions, such as, for example, smartphones, mobile phones and PDAs.

What is claimed is:

1. A single plate color imaging element, comprising:
a plurality of pixels comprised of photoelectric conversion elements arranged in a first direction and in a second direction perpendicular to the first direction; and
color filters disposed on the plurality of pixels, wherein
an array of the color filters comprises a basic array pattern in which the color filters are arranged in an array pattern corresponding to M×N (where M is an integer of four or greater, and N is an integer of four or greater) pixels in the first direction and in the second direction, the basic array pattern being repeatedly disposed in the first direction and in the second direction,
the color filters comprise at least a first filter corresponding to transparence, a second filter having higher transmittance with respect to a first visible light wavelength region in a visible light wavelength region than other visible light wavelength regions, a third filter having higher transmittance with respect to a second visible light wavelength region which is different from the first visible light wavelength region in the visible light wavelength region than other visible light wavelength regions, and a fourth filter having higher transmittance with respect to a third visible light wavelength region which is different from the first visible light wavelength region and the second visible light wavelength region in the visible light wavelength region than other visible light wavelength regions,
in the basic array pattern, the first filter, the second filter, the third filter, and the fourth filter are disposed at least one pixel each,
a color corresponding to the first visible light wavelength region has a higher contribution ratio to obtain a brightness signal than a color corresponding to the second visible light wavelength region and a color corresponding to the third visible light wavelength region,
in the array of the color filters, the first filter corresponding to at least one pixel is disposed on each pixel line extending in the first direction, on each pixel line extending in the second direction and on each pixel line extending in each of the third direction and the fourth direction which are tilted with respect to the first direction and the second direction, the second filter corresponding to at least one pixel is disposed on each pixel line extending in the first direction and on each pixel line extending in the second direction, and each of the third filter and the fourth filter is disposed adjacent to the second filter.

2. The color imaging element according to claim 1, wherein, in the array of the color filters, the second filters are disposed in two or more pixels among eight pixels adjacent around each of the pixel in which the first filter is disposed, the pixel in which the third filter is disposed and the pixel in which the fourth filter is disposed.

3. The color imaging element according to claim 2, wherein, in the array of the color filters, the second filters are disposed in one or more pixels among eight pixels adjacent around each of the pixels in which the second filters are disposed.

4. The color imaging element according to claim 1, wherein, in the basic array pattern, the third filter corresponding to at least one pixel and the fourth filter corresponding to at least one pixel are disposed on each pixel line extending in the first direction and on each pixel line extending in the second direction.

5. The color imaging element according to claim 1, wherein, in the basic array pattern, the numbers of pixels satisfy the following relationships:

the number of pixels in which the first filters are disposed≥the number of pixels in which the second filters are disposed≥the number of pixels in which the third filters are disposed, and the number of pixels in which the first filters are disposed≥the number of pixels in which the second filters are disposed≥the number of pixels in which the fourth filters are disposed.

6. The color imaging element according to claim 1, wherein, in the array of the color filters, the pixel in which the first filters are disposed are disposed adjacent to the pixels in which the second filters are disposed.

7. The color imaging element according to claim 1, wherein in the basic array pattern, the color filters are arranged in an array pattern corresponding to M×N (where M is an integer of six or greater, and N is an integer of six or greater) pixels in the first direction and in the second direction, and the basic array pattern comprises two first sub-arrays and two second sub-arrays which are two types of sub-arrays in which the color filters are arranged in an array pattern corresponding to (M/2)×(N/2) pixels, and in each of the first sub-arrays and the second sub-arrays, the first filter, the second filter, the third filter and the fourth filter are disposed at least one pixel each.

8. The color imaging element according to claim 1, wherein, in the basic array pattern, the color filters are arranged in an array pattern corresponding to M×N (where M is an integer of six or greater, and N is an integer of six or greater) pixels in the first direction and in the second direction, the basic array pattern comprises a first sub-array, a second sub-array, a third sub-array and a fourth sub-array which are four types of sub-arrays in which the color filters are arranged in an array pattern corresponding to (M/2)×(N/2) pixels, in each of the first sub-array, the second sub-array, the third sub-array and the fourth sub-array, the first filter, the second filter, the third filter, and the fourth filter are disposed at least one pixel each.

9. The color imaging element according to claim 7, wherein the sub-arrays configuring the basic array pattern comprise a pair of sub-arrays which has positional relationship in which the positions of the third filters and the positions of the fourth filters in each sub array are inverted.

10. The color imaging element according to claim 1, wherein the first filter has transmittance of 50% or higher in the first visible light wavelength region, the second visible light wavelength region and the third visible light wavelength region.

11. The color imaging element according to claim 1, wherein the first visible light wavelength region, the second visible light wavelength region, and the third visible light wavelength region correspond to the three primary colors, and the color filters further comprise a fifth filter which has higher transmittance with respect to a visible light wavelength region corresponding to a color different from the three primary colors than other visible light wavelength regions.

12. The color imaging element according to claim 1, wherein the first visible light wavelength region corresponds to green, the second visible light wavelength region corresponds to red, and the third visible light wavelength region corresponds to blue.

13. An imaging device comprising:

an imaging optical system;

a color imaging element at which a subject image is formed through the imaging optical system; and an image data generating unit that generates image data indicating the formed subject image, wherein the color imaging element is the color imaging element according to claim 1.

14. A single plate color imaging element, comprising:

a plurality of pixels comprised of photoelectric conversion elements arranged in a first direction and in a second direction perpendicular to the first direction; and color filters disposed on the plurality of pixels, wherein an array of the color filters comprises a basic array pattern in which the color filters are arranged in an array pattern corresponding to M×N (where M is an integer of four or greater, and N is an integer of four or greater) pixels in the first direction and in the second direction, the basic array pattern being repeatedly disposed in the first direction and in the second direction, the color filters comprise at least a first filter corresponding to transparence, a second filter having higher transmittance with respect to a first visible light wavelength region in a visible light wavelength region than other visible light wavelength regions, a third filter having higher transmittance with respect to a second visible light wavelength region which is different from the first visible light wavelength region in the visible light wavelength region than other visible light wavelength regions, and a fourth filter having higher transmittance with respect to a third visible light wavelength region which is different from the first visible light wavelength region and the second visible light wavelength region in the visible light wavelength region than other visible light wavelength regions, in the basic array pattern, the first filter, the second filter, the third filter, and the fourth filter are disposed at least one pixel each, the second filter has a peak of transmittance within a range of a wavelength between 480 nm and 570 nm, the third filter and the fourth filter have peaks of transmittance outside the range, in the array of the color filters, the first filter corresponding to at least one pixel is disposed on each pixel line extending in the first direction, on each pixel line extending in the second direction and on each pixel line extending in each of the third direction and the fourth direction which are tilted with respect to the first direction and the second direction, the second filter corresponding to at least one pixel is disposed on each pixel line extending in the first direction and on each pixel line extending in the second direction, and each of the third filter and the fourth filter is disposed adjacent to the second filter.

15. The color imaging element according to claim 14, wherein, in the array of the color filters, the second filters are disposed in two or more pixels among eight pixels adjacent around each of the pixel in which the first filter is disposed, the pixel in which the third filter is disposed and the pixel in which the fourth filter is disposed.

16. The color imaging element according to claim 15, wherein, in the array of the color filters, the second filters are disposed in one or more pixels among eight pixels adjacent around each of the pixels in which the second filters are disposed.

17. The color imaging element according to claim 14, wherein, in the basic array pattern, the third filter corresponding to at least one pixel and the fourth filter corresponding to at least one pixel are disposed on each pixel line extending in the first direction and on each pixel line extending in the second direction.

18. The color imaging element according to claim 14, wherein, in the basic array pattern, the numbers of pixels satisfy the following relationships:
the number of pixels in which the first filters are disposed≥the number of pixels in which the second filters are disposed≥the number of pixels in which the third filters are disposed, and
the number of pixels in which the first filters are disposed≥the number of pixels in which the second filters are disposed≥the number of pixels in which the fourth filters are disposed.

19. The color imaging element according to claim 14, wherein the first filter has transmittance of 50% or higher in the first visible light wavelength region, the second visible light wavelength region and the third visible light wavelength region.

20. An imaging device comprising:
an imaging optical system;
a color imaging element at which a subject image is formed through the imaging optical system; and
an image data generating unit that generates image data indicating the formed subject image,
wherein the color imaging element is the color imaging element according to claim 14.

21. A single plate color imaging element, comprising:
a plurality of pixels comprised of photoelectric conversion elements arranged in a first direction and in a second direction perpendicular to the first direction; and
color filters disposed on the plurality of pixels, wherein
an array of the color filters comprises a basic array pattern in which the color filters are arranged in an array pattern corresponding to M×N (where M is an integer of four or greater, and N is an integer of four or greater) pixels in the first direction and in the second direction, the basic array pattern being repeatedly disposed in the first direction and in the second direction,
the color filters comprise at least a first filter corresponding to transparence, a second filter having higher transmittance with respect to a first visible light wavelength region in a visible light wavelength region than other visible light wavelength regions, a third filter having higher transmittance with respect to a second visible light wavelength region which is different from the first visible light wavelength region in the visible light wavelength region than other visible light wavelength regions, and a fourth filter having higher transmittance with respect to a third visible light wavelength region which is different from the first visible light wavelength region and the second visible light wavelength region in the visible light wavelength region than other visible light wavelength regions,
in the basic array pattern, the first filter, the second filter, the third filter, and the fourth filter are disposed at least one pixel each,
the first visible light wavelength region falls within a range of a wavelength between 500 nm and 560 nm,
in the array of the color filters, the first filter corresponding to at least one pixel is disposed on each pixel line extending in the first direction, on each pixel line extending in the second direction and on each pixel line extending in each of the third direction and the fourth direction which are tilted with respect to the first direction and the second direction, the second filter corresponding to at least one pixel is disposed on each pixel line extending in the first direction and on each pixel line extending in the second direction, and each of the third filter and the fourth filter is disposed adjacent to the second filter.

22. The color imaging element according to claim 21, wherein, in the array of the color filters, the second filters are disposed in two or more pixels among eight pixels adjacent around each of the pixel in which the first filter is disposed, the pixel in which the third filter is disposed and the pixel in which the fourth filter is disposed.

23. The color imaging element according to claim 22, wherein, in the array of the color filters, the second filters are disposed in one or more pixels among eight pixels adjacent around each of the pixels in which the second filters are disposed.

24. The color imaging element according to claim 21, wherein, in the basic array pattern, the third filter corresponding to at least one pixel and the fourth filter corresponding to at least one pixel are disposed on each pixel line extending in the first direction and on each pixel line extending in the second direction.

25. The color imaging element according to claim 21, wherein, in the basic array pattern, the numbers of pixels satisfy the following relationships:
the number of pixels in which the first filters are disposed≥the number of pixels in which the second filters are disposed≥the number of pixels in which the third filters are disposed, and
the number of pixels in which the first filters are disposed≥the number of pixels in which the second filters are disposed≥the number of pixels in which the fourth filters are disposed.

26. The color imaging element according to claim 21, wherein the first filter has transmittance of 50% or higher in the first visible light wavelength region, the second visible light wavelength region and the third visible light wavelength region.

27. An imaging device comprising:
an imaging optical system;
a color imaging element at which a subject image is formed through the imaging optical system; and
an image data generating unit that generates image data indicating the formed subject image,
wherein the color imaging element is the color imaging element according to claim 21.

28. A single plate color imaging element, comprising:
a plurality of pixels comprised of photoelectric conversion elements arranged in a first direction and in a second direction perpendicular to the first direction; and
color filters disposed on the plurality of pixels, wherein
an array of the color filters comprises a basic array pattern in which the color filters are arranged in an array pattern corresponding to M×N (where M is an integer of four or greater, and N is an integer of four or greater) pixels in the first direction and in the second direction, the basic array pattern being repeatedly disposed in the first direction and in the second direction,
the color filters comprise at least a first filter corresponding to transparence, a second filter having higher transmittance with respect to a first visible light wavelength region in a visible light wavelength region than other visible light wavelength regions, a third filter having higher transmittance with respect to a second visible light wavelength region which is different from the first visible light wavelength region in the visible light wavelength region than other visible light wavelength regions, and a fourth filter having higher transmittance with respect to a third visible light wavelength region which is different from the first visible light wavelength region and the second visible light wavelength region in the visible light wavelength region than other visible light wavelength regions, in the basic array pattern, the first filter, the second filter, the third filter, and the fourth filter are disposed at least one pixel each, the first visible light wavelength region comprises a visible light wavelength region corresponding to a color contributing most to a brightness signal among three primary colors and a visible light wavelength region corresponding to a color different from the three primary colors, the second filter includes a filter having higher transmittance with respect to the visible light wavelength region corresponding to the color contributing most to a brightness signal among the three primary colors than other visible light wavelength regions, and a filter having higher transmittance with respect to the visible light wavelength region corresponding to the color different from the three primary colors than other visible light wavelength regions, in the array of the color filters, the first filter corresponding to at least one pixel is disposed on each pixel line extending in the first direction, on each pixel line extending in the second direction and on each pixel line extending in each of the third direction and the fourth direction which are tilted with respect to the first direction and the second direction, the second filter corresponding to at least one pixel is disposed on each pixel line extending in the first direction and on each pixel line extending in the second direction, and each of the third filter and the fourth filter is disposed adjacent to the second filter.

29. The color imaging element according to claim 28, wherein, in the array of the color filters, the second filters are disposed in two or more pixels among eight pixels adjacent around each of the pixel in which the first filter is disposed, the pixel in which the third filter is disposed and the pixel in which the fourth filter is disposed.

30. The color imaging element according to claim 29, wherein, in the array of the color filters, the second filters are disposed in one or more pixels among eight pixels adjacent around each of the pixels in which the second filters are disposed.

31. The color imaging element according to claim 28, wherein, in the basic array pattern, the third filter corresponding to at least one pixel and the fourth filter corresponding to at least one pixel are disposed on each pixel line extending in the first direction and on each pixel line extending in the second direction.

32. The color imaging element according to claim 28, wherein, in the basic array pattern, the numbers of pixels satisfy the following relationships:

the number of pixels in which the first filters are disposed≥the number of pixels in which the second filters are disposed≥the number of pixels in which the third filters are disposed, and the number of pixels in which the first filters are disposed≥the number of pixels in which the second filters are disposed≥the number of pixels in which the fourth filters are disposed.

33. The color imaging element according to claim 28, wherein the first filter has transmittance of 50% or higher in the first visible light wavelength region, the second visible light wavelength region and the third visible light wavelength region.

34. An imaging device comprising:
an imaging optical system;
a color imaging element at which a subject image is formed through the imaging optical system; and
an image data generating unit that generates image data indicating the formed subject image,
wherein the color imaging element is the color imaging element according to claim 28.

* * * * *